(12) United States Patent
Fukuda

(10) Patent No.: US 8,520,765 B2
(45) Date of Patent: Aug. 27, 2013

(54) INFORMATION PROCESSING APPARATUS, SIGNAL TRANSMISSION METHOD AND DECODING METHOD

(75) Inventor: Kunio Fukuda, Tokyo (JP)

(73) Assignee: Sony Corporation, Tokyo (JP)

( * ) Notice: Subject to any disclaimer, the term of this patent is extended or adjusted under 35 U.S.C. 154(b) by 1034 days.

(21) Appl. No.: 12/550,130

(22) Filed: Aug. 28, 2009

(65) Prior Publication Data
US 2010/0054346 A1    Mar. 4, 2010

(30) Foreign Application Priority Data

Aug. 29, 2008    (JP) ................................ P2008-221858

(51) Int. Cl.
*H04L 27/00* (2006.01)
(52) U.S. Cl.
USPC ............. 375/295; 327/291; 332/106; 341/20; 341/173
(58) Field of Classification Search
USPC ....................................................... 375/295
See application file for complete search history.

(56) References Cited

U.S. PATENT DOCUMENTS

| | | | | |
|---|---|---|---|---|
| 5,872,666 | A  * | 2/1999 | Saiki et al. ...................... | 360/46 |
| 2003/0002112 | A1* | 1/2003 | Hirano et al. .................. | 359/161 |
| 2003/0112031 | A1* | 6/2003 | Agrawal et al. ................. | 326/41 |
| 2005/0120286 | A1* | 6/2005 | Akamatsu ..................... | 714/792 |
| 2006/0061494 | A1* | 3/2006 | Hosaka et al. .................. | 341/50 |
| 2006/0129728 | A1* | 6/2006 | Hampel ........................ | 710/118 |
| 2009/0041169 | A1* | 2/2009 | Fujita et al. ................... | 375/354 |

FOREIGN PATENT DOCUMENTS

| | | |
|---|---|---|
| JP | 62-269444 | 11/1987 |
| JP | 02-196546 | 8/1990 |
| JP | 03-172046 | 7/1991 |
| JP | 07-264141 | 10/1995 |

* cited by examiner

*Primary Examiner* — Erin File
(74) *Attorney, Agent, or Firm* — Finnegan, Henderson, Farabow, Garrett & Dunner, L.L.P.

(57) ABSTRACT

There is provided an information processing apparatus, including a data encoding unit that generates an encoded signal in partial response mode having a transmission speed Fb by encoding input data; a clock signal addition unit that synchronously adds a clock signal at frequency Fb having an amplitude value larger than that of the encoded signal to the encoded signal generated by the data encoding unit; and a signal transmission unit that transmits the encoded signal obtained by the clock signal being added by the clock signal addition unit through a predetermined transmission line.

5 Claims, 19 Drawing Sheets

CIRCUIT CONFIGURATION EXAMPLE OF CLOCK DETECTION UNIT 332

CIRCUIT CONFIGURATION EXAMPLE OF DECODER 334

FIG. 12

DETERMINATION TABLE (STORAGE UNIT 364) FOR DATA DETERMINATION

| COMPARATOR 354 | COMPARATOR 356 | COMPARATOR 358 | COMPARATOR 360 | OUTPUT DATA |
|---|---|---|---|---|
| 1 | 1 | 1 | 1 | 1 |
| 0 | 1 | 1 | 1 | 0 |
| 0 | 0 | 1 | 1 | 1 |
| 0 | 0 | 0 | 1 | 0 |
| 0 | 0 | 0 | 0 | 1 |

FIG. 18

ENCODING PROCESSING BY ENCODER 402: S3=S1+S2

| S1 | 0 | 0 | 0 | 1 | 1 | 0 | 1 | 0 | 0 | 1 | 1 | 1 | 1 | 0 | 0 | 0 | 1 | 0 | 0 |
|---|---|---|---|---|---|---|---|---|---|---|---|---|---|---|---|---|---|---|---|
| S2 | 0 | 0 | 0 |   |   | -1 | -1 |   | -1 |   |   | -1 | -1 | -1 | -1 |   |   |   | -1 |
| S3 | 0 | 0 | 0 | 1 | 1 | -1 | 0 | 0 | -1 | 1 | 1 | 0 | 0 | -1 | -1 | 0 | 1 | 0 | -1 |

FIG. 19

DECODING PROCESSING BY DECODER 434: S4+S5=S6

| S4 | 0 | 0 | 0 | 1 | -1 | 0 | 1 | -1 | 1 | 1 | 0 | 0 | -1 | -1 | 0 | 1 | 0 | -1 |
|----|---|---|---|---|----|---|---|----|---|---|---|---|----|----|---|---|---|----|
| S5 | 0 |   | 0 | 0 | 1  | 1 | 0 | 1  | 0 | 0 | 1 | 1 | 1  | 1  | 1 | 0 | 0 | 1  |
| S6 | 0 | 0 | 0 | 1 | 0  | 1 | 0 | 0  | 1 | 1 | 1 | 1 | 0  | 0  | 1 | 1 | 0 | 0  |

REMOVAL METHOD OF LINE SPECTRUM BY BANDSTOP FILTER 472

INFORMATION PROCESSING APPARATUS, SIGNAL TRANSMISSION METHOD AND DECODING METHOD

BACKGROUND OF THE INVENTION

1. Field of the Invention

The present invention relates to an information processing apparatus, a signal transmission method, and a decoding method.

2. Description of the Related Art

Mobile terminals exemplified by mobile phones frequently include a movable member as a connecting portion between an operation portion operated by a user and a display portion in which information is displayed. For example, an opening/closing structure of a folding mobile phone is typical of such a movable member. Further, recent mobile phones have, in addition to the calling and mail functions, a viewing function of images or an imaging function and thus, it is necessary for the connecting portion to be movable complexly in accordance with usage of the user. When the viewing function of images is used, for example, the user desires to direct the display portion toward the user and the operation portion unnecessary for viewing put away. Thus, a structure allowing the orientation or position of the display portion to change in accordance with usage thereof when a mobile phone is used as an ordinary phone, used as a digital camera, used as a TV set and the like is demanded.

As a matter of fact, a large number of signal lines and power lines are wired through the connecting portion between the operation portion and display portion. For example, several tens of wires are connected in parallel in the display portion (see FIG. 1). Thus, if a movable member capable of making complex motions described above is used as a connecting portion, reliability and the like of such wires will significantly decrease. For such reasons, technology used is being shifted from the parallel transmission method to the serial transmission method (see FIG. 2) to reduce the number of signal lines in the connecting portion. Naturally, a technological shift for similar reasons is not limited to the world of mobile phones and occurs in the world of various electronic devices in which complex wiring is demanded. In addition to the above reason, serialization also seeks to reduce electromagnetic noise (EMI: Electro Magnetic Interference).

In the serial transmission method, transmission data is transmitted after being encoded according to a predetermined method. For example, the NRZ (Non Return to Zero) coding mode, Manchester coding mode, or AMI (Alternate Mark Inversion) coding mode is used as the coding mode. Japanese Patent Application Laid-Open No. 3-109843, for example, discloses a technology to transmit data by using the AIM code, which is a typical example of bipolar code. Further, the Patent Document also discloses a technology to represent and transmit a data clock by a median value of a signal level and reproduce the data clock based on the signal level on the receiving side.

SUMMARY OF THE INVENTION

A signal in the NRZ coding mode among the above coding modes contains a DC component. Thus, it is difficult to transmit a signal in the NRZ coding mode together with a DC component of a power supply or the like. On the other hand, a signal in the Manchester coding mode or AMI (Alternate Mark Inversion) coding mode does not contain a DC component. Thus, such a signal can be transmitted together with a DC component of a power supply or the like. However, it is necessary for the Manchester coding mode or AMI coding mode to set up a PLL (Phase-Locked Loop) circuit to reproduce a data clock of a signal on the receiving side. Thus, with a PLL circuit provided on the receiving side, current consumption will increase. Moreover, data is transmitted by using rise and fall shapes of amplitude in the Manchester coding mode and thus, it is necessary to transmit data at a clock two times faster than a data rate. As a result, a higher clock operation will cause an increase in current consumption.

In view of the above issues, a code that does not contain any DC component and needs no PLL circuit during clock reproduction and a signal transmission technology using the code have been developed. According to the technology, encoding is performed in such a way that input data containing a first bit value and a second bit value that is mutually different is represented by a plurality of first amplitude values, the second bit value is represented by a second amplitude value that is different from the first amplitude values, the same amplitude value is not taken successively, and polarity of the amplitude value is reversed in each period before transmission. However, it is necessary to repeat threshold determination processing many times to determine the first and second bit values from an encoded transmission signal according to the technology. Thus, it is necessary for the receiving side to remove a clock component to make threshold determination processing more efficient.

The present invention has been made in view of the above issue and an object thereof is to provide a novel and improved information processing apparatus that transmits data using an encoded signal that contains no DC component and can reproduce a clock on the receiving side without using PLL and can make threshold determination processing more efficient by removing a line spectrum corresponding to a clock component on the frequency axis from the encoded signal, a signal transmission method, and a decoding method.

In order to solve the above issue, according to an embodiment of the present invention, there is provided an information processing apparatus, including a data encoding unit that generates an encoded signal in partial response mode having a transmission speed Fb by encoding input data; a clock signal addition unit that synchronously adds a clock signal at frequency Fb having an amplitude value larger than that of the encoded signal to the encoded signal generated by the data encoding unit; and a signal transmission unit that transmits the encoded signal obtained by the clock signal being added by the clock signal addition unit through a predetermined transmission line.

The information processing apparatus may further include a signal receiving unit that receives the encoded signal through the predetermined transmission line; a band-elimination filter that removes a frequency component of a predetermined width containing the frequency Fb from the encoded signal received by the signal receiving unit; and an input data decoding unit that performs decoding to obtain the input data based on the amplitude value of the signal output from the band-elimination filter.

The information processing apparatus may further include a clock component detection unit that detects a clock component of the encoded signal based on a reversal period by detecting the reversal period of polarity held by the amplitude value of the encoded signal received by the signal receiving unit, and the input data decoding unit may use the clock component detected by the clock component detection unit to obtain the input data by decoding.

The predetermined transmission line may be a power line through which a DC current is passed, and the encoded signal may be transmitted after being superimposed on the DC current and separated from the DC current by the signal receiving unit.

In order to solve the above issue, according to another embodiment of the present invention, there is provided an information processing apparatus, including a signal receiving unit that receives an encoded signal generated by synchronously adding a clock signal at frequency Fb having an amplitude value larger than that of an encoded signal to the encoded signal in partial response mode having a transmission speed Fb; a band-elimination filter that removes a frequency component of a predetermined width containing the frequency Fb from the encoded signal received by the signal receiving unit; and a signal decoding unit that performs decoding to obtain the encoded signal in the partial response mode based on the amplitude value of the signal from which the frequency component of the predetermined width has been removed by the band-elimination filter.

In order to solve the above issue, according to another embodiment of the present invention, there is provided a signal transmission method, including the steps of generating an encoded signal in partial response mode having a transmission speed Fb by encoding input data; adding synchronously a clock signal at frequency Fb having an amplitude value larger than that of the encoded signal to the encoded signal generated by the data encoding step; transmitting the encoded signal obtained by the clock signal being added in the clock signal addition step through a predetermined transmission line; receiving the encoded signal transmitted in the signal transmission step through the predetermined transmission line; removing a frequency component of a predetermined width from the encoded signal received in the signal receiving step using a band-elimination filter that removes the frequency component of the predetermined width containing the frequency Fb; and performing decoding to obtain the input data based on the amplitude value of the signal output from the band-elimination filter.

In order to solve the above issue, according to another embodiment of the present invention, there is provided a decoding method, including the steps of receiving an encoded signal generated by synchronously adding a clock signal at frequency Fb having an amplitude value larger than that of an encoded signal to the encoded signal in partial response mode having a transmission speed Fb; removing a frequency component of a predetermined width containing the frequency Fb from the encoded signal received in the signal receiving step; and performing decoding to obtain the encoded signal in the partial response mode based on the amplitude value of the signal from which the frequency component of the predetermined width has been removed in the predetermined band component removal step.

In order to solve the above issue, according to another embodiment of the present invention, there can be provided a program for causing a computer to realize the functions of the information processing apparatus. There is also provided a computer readable recording medium recorded with such program.

According to the embodiments of the present invention as described above, data is transmitted using an encoded signal that contains no DC component and can reproduce a clock on the receiving side without using PLL and threshold determination processing can be made more efficient by removing a line spectrum corresponding to a clock component on the frequency axis from the encoded signal. The circuit configuration used for threshold determination is simplified and the circuit scale is reduced by the clock component being removed by the receiving side. Further, the interval between thresholds is widened so that the setting precision of the thresholds is relaxed.

BRIEF DESCRIPTION OF THE DRAWINGS

FIG. 12 shows a configuration example of a determination table for data determination;

FIG. 18 shows an encoding processing method according to the partial response mode;

FIG. 19 shows a decoding processing according to the partial response mode;

DETAILED DESCRIPTION OF THE PREFERRED EMBODIMENTS

Figure 1:
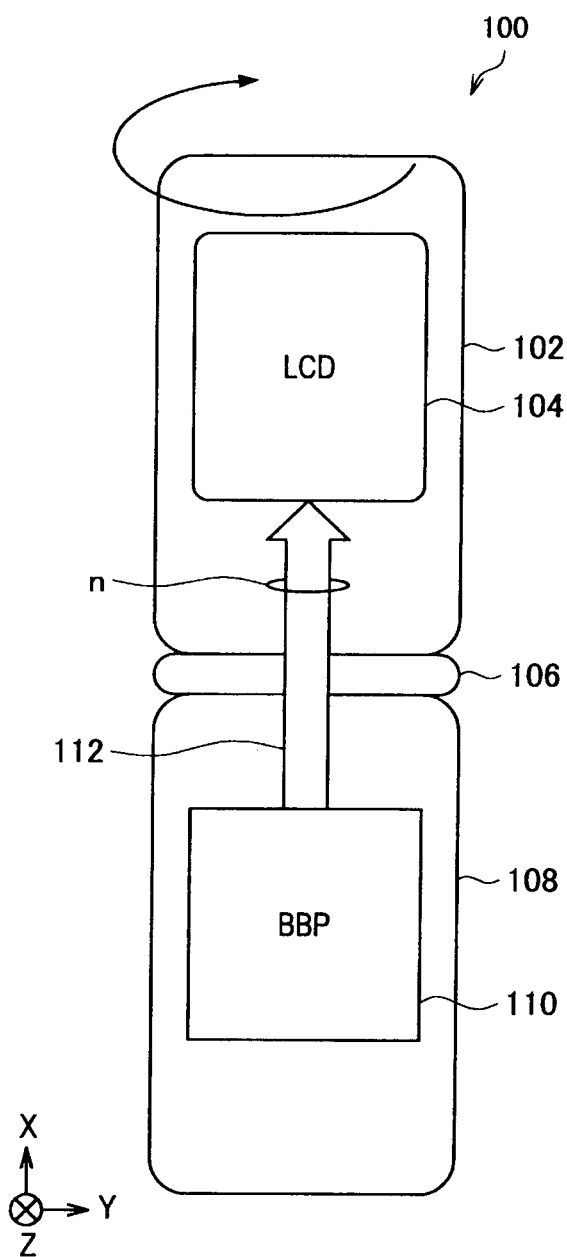
FIG. 1 shows a configuration example of a mobile terminal.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[Flow of the Description]

The flow of the description about an embodiment of the present embodiment described below will be briefly mentioned. First, technical issues of a mobile terminal or the like that adopts a parallel transmission method will be briefly described with reference to FIG. 1. Next, issues of signal transmission technology that adopts the serial transmission method will be described with reference to FIG. 2 to FIG. 6.

Next, a new signal transmission technology developed to solve issues of the signal transmission technology that adopts the serial transmission method will be described with reference to FIG. 7 to FIG. 13. The new signal transmission technology concerns a mode in which a signal is transmitted using a code that does not contain any DC component and needs no PLL circuit during clock reproduction. The technology according to an embodiment of the present invention described below concerns a technology to make decoding processing more efficient when bit values are extracted from a signal if such a code is used.

Figure 14:
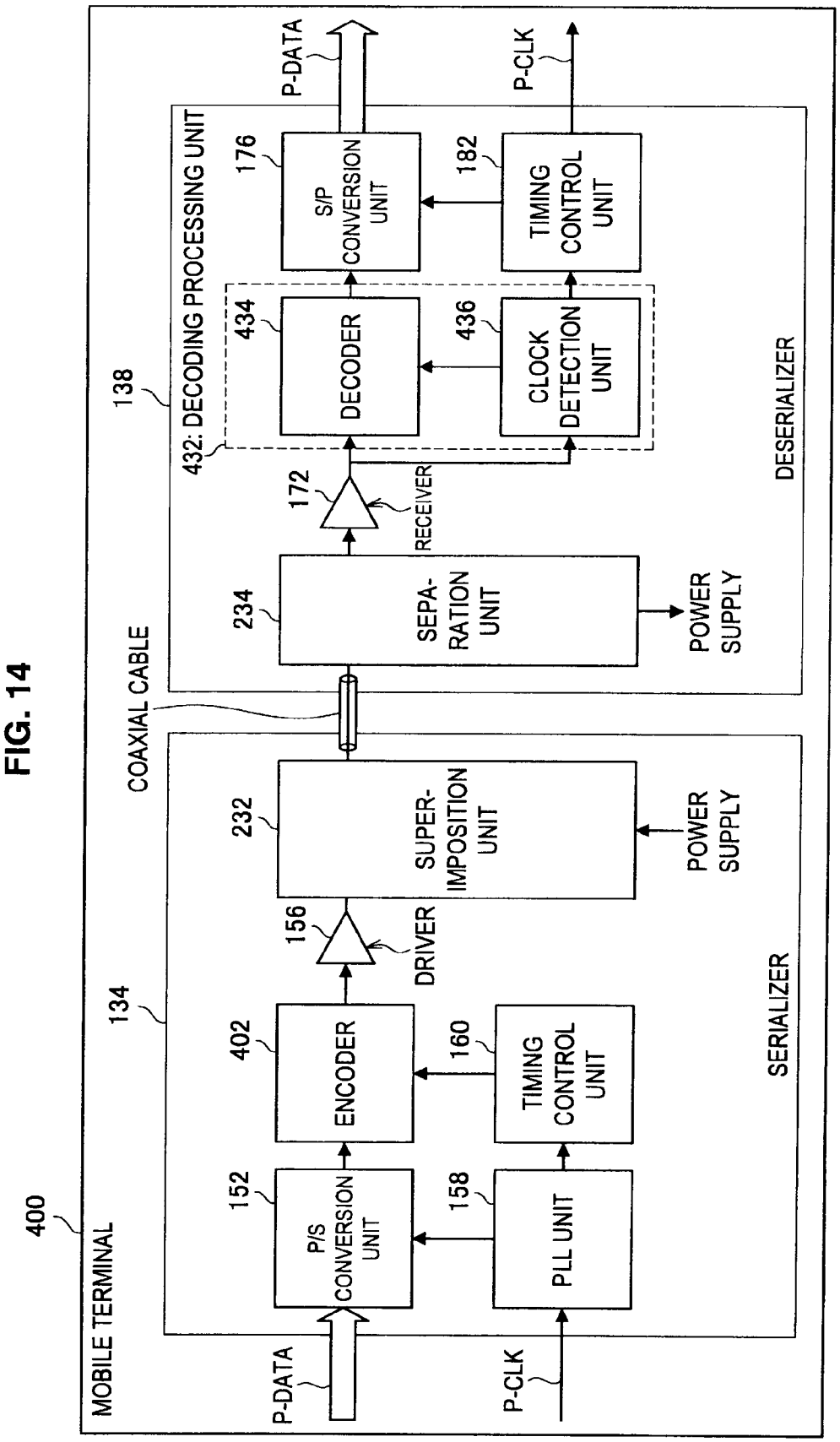
FIG. 14 shows a function configuration example of the mobile terminal according to an embodiment of the present invention.

Next, the function configuration of a mobile terminal according to an embodiment of the present invention will be described with reference to FIG. 14. An encoding method according to the embodiment will also be described with reference to FIG. 15. Further, frequency characteristics of an encoded signal obtained by the encoding method will be described with reference to FIG. 16. Then, a configuration example of an encoding circuit and a decoding circuit in partial response mode will be described with reference to FIG. 17. Next, an encoding processing method and a decoding processing method according to the embodiment will be described with reference to FIG. 18 and FIG. 19.

Next, the circuit configuration of a decoder according to the embodiment will be described with reference to FIG. 20. Further, transfer characteristics of a band-elimination filter contained in the decoder and changes of frequency characteristics before and after passing through the band-elimination filter will be described with reference to FIG. 21. Lastly, technical ideas according to the embodiment will be summarized and operation effects obtained from the technical ideas will be briefly described.

[Summary of Issues]

Before describing technology according to an embodiment of the present invention in detail, issues to be solved by the embodiment will be briefly summarized.

(Parallel Transmission Method)

A configuration example of a mobile terminal 100 in which a parallel transmission method is adopted will be briefly described with reference to FIG. 1. FIG. 1 is an explanatory view showing a configuration example of the mobile terminal 100 in which the parallel transmission method is adopted. In FIG. 1, a mobile phone is schematically illustrated as an example of the mobile terminal 100. However, the technology according to a description that follows is not limited to the mobile phone.

As shown in FIG. 1, the mobile terminal 100 mainly includes a display unit 102, a liquid crystal unit 104 (LCD), a connection unit 106, an operation unit 108, a baseband processor 110 (BBP), and a parallel signal line 112. Incidentally, the display unit 102 may be called a display side and the operation unit 108 a main body side. In the description that follows, an example in which an image signal is transmitted from the main body side to the display side is taken. Naturally, the technology described below is not limited to the case of example.

As shown in FIG. 1, the liquid crystal unit 104 is provided in the display unit 102. Then, an image signal transmitted via the parallel signal line 112 is displayed in the liquid crystal unit 104. The connection unit 106 is a member to connect the display unit 102 and the operation unit 108. The connecting member forming the connection unit 106 has, for example, a structure to allow the display unit 102 to rotate in a Z-Y plane by 180 degrees. The connecting member also has a structure so that the display unit 102 is formed to be rotatable in an X-Y plane and the mobile terminal 100 can be folded. Incidentally, the connecting member may have a structure to allow the display unit 102 to move in a free direction.

The baseband processor 110 is an arithmetic processing unit that provides an execution function of communication control and applications of the mobile terminal 100. A parallel signal output from the baseband processor 110 is transmitted to the liquid crystal unit 104 of the display unit 102 through the parallel signal line 112. The parallel signal line 112 has a large number of signal lines wired therein. In the case of a mobile phone, for example, the number n of signal lines is about 50. The transmission speed of an image signal is about 130 Mbps when the resolution of the liquid crystal unit 104 is QVGA. The parallel signal line 112 is wired to pass through the connection unit 106.

That is, the connection unit 106 has a large number of signal lines forming the parallel signal line 112 therein. If the movable range of the connection unit 106 is extended as described above, the possibility of the parallel signal line 112 being damaged by movement thereof increases. As a result, reliability of the parallel signal line 112 will decrease. If, on the other hand, an attempt is made to maintain reliability of the parallel signal line 112, the movable range of the connection unit 106 will be significantly limited. For these reasons, the serial transmission method is frequently adopted for the mobile terminal 100 for the purpose of making flexibility of the movable member forming the connection unit 106 consistent with reliability of the parallel signal line 112. Also in terms of electromagnetic noise (EMI), serialization of transmission line has been promoted.

(Serial Transmission Method)

Figure 2:
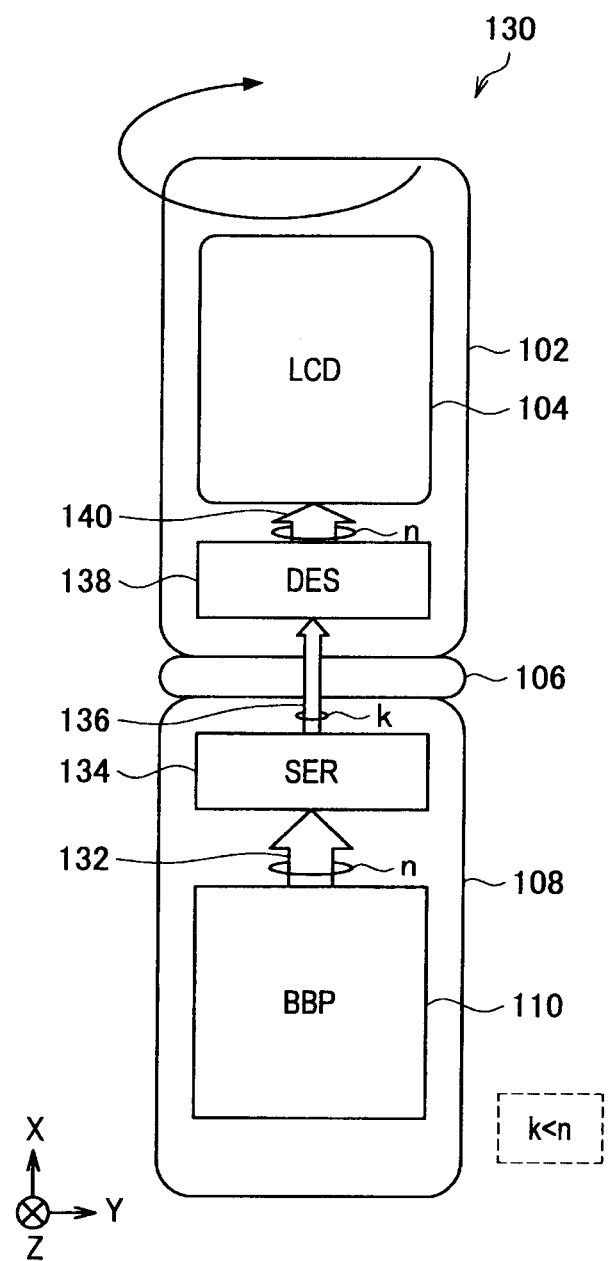
FIG. 2 shows a configuration example of the mobile terminal.

Thus, a configuration example of a mobile terminal 130 in which the serial transmission method is adopted will be briefly described with reference to FIG. 2. FIG. 2 is an explanatory view showing a configuration example of the mobile terminal 130 in which the serial transmission method is adopted. In FIG. 2, a mobile phone is schematically illustrated as an example of the mobile terminal 130. However, the technology according to a description that follows is not limited to the mobile phone. The same reference numerals are attached to components having substantially the same function as those of the mobile terminal 100 in the parallel transmission method shown in FIG. 1 to omit a detailed description thereof.

As shown in FIG. 2, the mobile terminal 130 mainly includes the display unit 102, the liquid crystal unit 104 (LCD), the connection unit 106, the operation unit 108, the baseband processor 110 (BBP), parallel signal lines 132 and 140, a serializer 134, a serial signal line 136, and a deserializer 138.

In contrast to the mobile terminal 100, the mobile terminal 130 transmits an image signal by the serial transmission method through the serial signal line 136 wired in the connection unit 106. Thus, the operation unit 108 is provided with the serializer 134 for serializing parallel signals output from the baseband processor 110. On the other hand, the display unit 102 is provided with the deserializer 138 to parallelize a serial signal transmitted through the serial signal line 136.

The serializer 134 converts parallel signals output from the baseband processor 110 and input via the parallel signal line 132 into a serial signal. The serial signal converted by the serializer 134 is input into the deserializer 138 through the serial signal line 136. Then, the deserializer 138 restores the original parallel signals from the input serial signal, which are input into the liquid crystal unit 104 through the parallel signal line 140.

A data signal encoded, for example, by NRZ coding mode is alone transmitted or a data signal and a clock signal are together transmitted through the serial signal line 136. The number k of wires in the serial signal line 136 is significantly smaller than the number n of wires in the parallel signal line 112 in the mobile terminal 1 in FIG. 1 (k<<n). For example, the number k of wires can be reduced to several wires.

Thus, flexibility of the movable range of the connection unit 106 in which the serial signal line 136 is wired can be considered to be extremely larger than the connection unit 106 in which the parallel signal line 112 is wired. At the same time, reliability of the serial signal line 136 can be considered to be higher. Incidentally, a differential signal such as LVDS (Low Voltage Differential Signal) is used as a serial signal passing through the serial signal line 136.

(Function Configuration)

Figure 3:
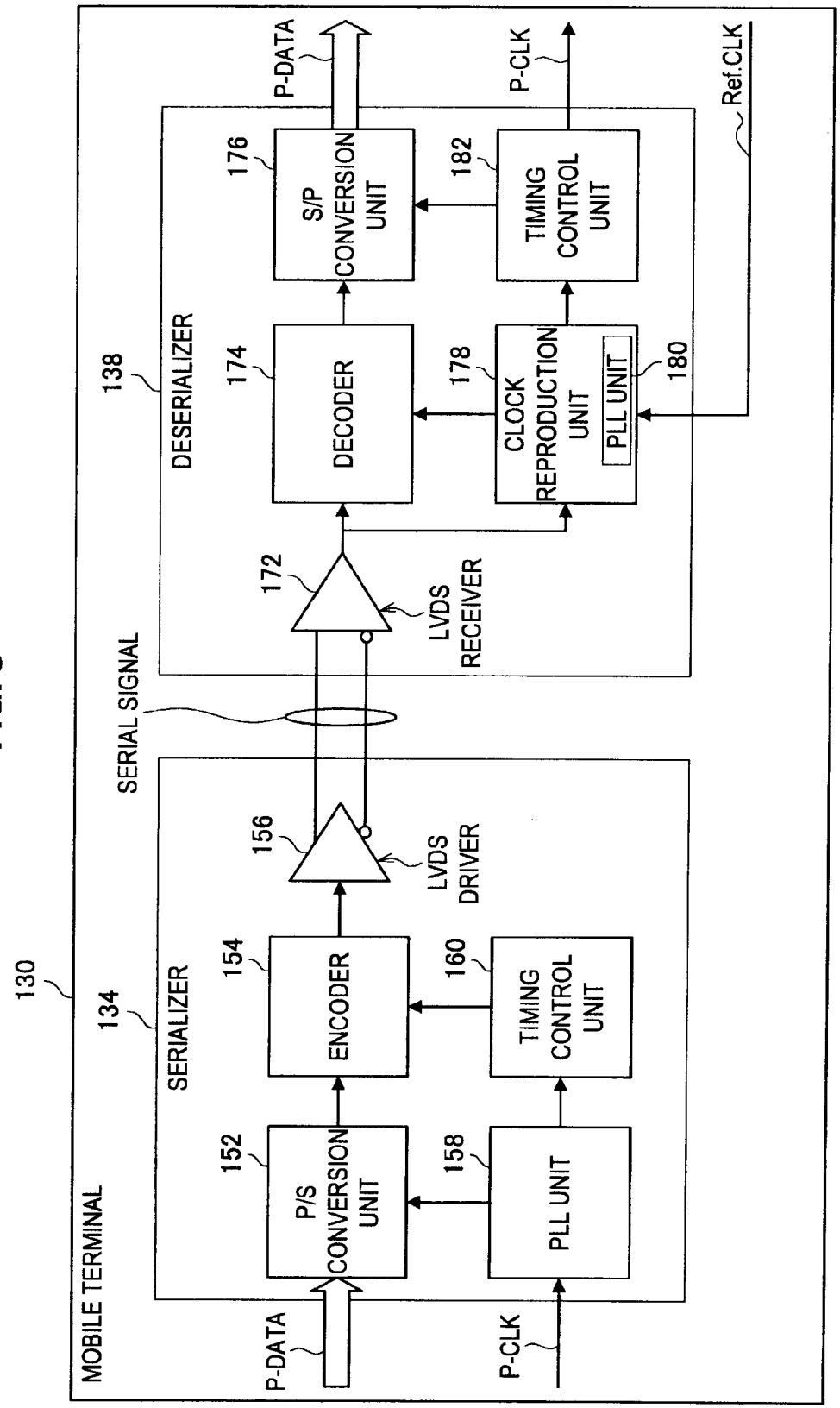
FIG. 3 shows a function configuration example of the mobile terminal involved in serial transmission.

Here, the function configuration of the mobile terminal 130 in which the serial transmission method is adopted will be described with reference to FIG. 3. FIG. 3 is an explanatory view showing a function configuration example of the mobile terminal 130 in which the serial transmission method is adopted. However, FIG. 3 is an explanatory view illustrated by focusing on the function configuration of the serializer 134 and the deserializer 138 and omits an illustration of other components.

(Serializer 134)

As shown in FIG. 3, the serializer 134 includes a P/S conversion unit 152, an encoder 154, an LVDS driver 156, a PLL unit 158, and a timing control unit 160.

As shown in FIG. 3, parallel signals (P-DATA) and a clock for parallel signals (P-CLK) are input from the baseband processor 110 into the serializer 134. The parallel signals input into the serializer 134 are converted into a serial signal by the P/S conversion unit 152. The serial signal converted by the P/S conversion unit 152 is input into the encoder 154. The encoder 154 adds a header and the like to the serial signal and then inputs the serial signal into the LVDS driver 156. The LVDS driver 156 transmits the input serial signal to the deserializer 138 by the differential transmission method based on LVDS.

The clock for parallel signals input into the serializer 134, on the other hand, is input into the PLL unit 158. The PLL unit 158 generates a clock for serial signal from the clock for parallel signals and inputs the clock for serial signal into the P/S conversion unit 152 and the timing control unit 160. The timing control unit 160 controls transmission timing of a serial signal by the encoder 154 based on the input clock for serial signal.

(Deserializer 138)

As shown in FIG. 3, the deserializer 138 mainly includes an LVDS receiver 172, a decoder 174, an S/P conversion unit 176, a clock reproduction unit 178, a PLL unit 180, and a timing control unit 182.

As shown in FIG. 3, a serial signal is transmitted from the serializer 134 to the deserializer 138 by the differential transmission method based on LVDS. The serial signal is received by the LVDS receiver 172. The serial signal received by the LVDS receiver 172 is input into the decoder 174 and the clock reproduction unit 178. The decoder 174 detects a head part of data by referencing the header of the input serial signal and inputs the serial signal into the S/P conversion unit 176. The S/P conversion unit 176 converts the input serial signal into parallel signals (P-DATA). The parallel signals converted by the S/P conversion unit 176 are output to the liquid crystal unit 104.

The clock reproduction unit 178, on the other hand, references a reference clock input from outside to reproduce a clock for parallel signals from the clock for serial signal using the built-in PLL unit 180. The clock for parallel signals reproduced by the clock reproduction unit 178 is input into the decoder 174 and the timing control unit 182. The timing control unit 182 controls reception timing based on the clock for parallel signals input from the clock reproduction unit 178. The clock for parallel signals (P-CLK) input into the timing control unit 182 is output to the liquid crystal unit 104.

Thus, parallel signals (P-DATA) and a clock for parallel signals (P-CLK) input from the baseband processor 110 into the serializer 134 are transmitted to the deserializer 138 after being converted into serial signals. Then, the input serial signals are restored to the original parallel signals and clock for parallel signals by the deserializer 138 before being output to the liquid crystal unit 104.

By transmitting parallel signals after being converted into a serial signal like the mobile terminal 130 described above, the transmission line thereof is serialized. As a result, the movable range of a portion in which the serial signal line is arranged is extended, improving flexibility concerning arrangement of the display unit 102. Thus, for example, the mobile terminal 130 can be modified so that, when a TV program is viewed using the mobile terminal 130, the arrangement of the display unit 102 is wide when viewed from a user. With such improved flexibility, usages of the mobile terminal 130 increase, creating, in addition to various functions as a communication terminal, various forms of use such as viewing of images and music.

(Application Example: Data Transmission Method Using a Power Line)

Incidentally, the encoder 154 of the mobile terminal 130 may be configured to encode input data based on the Manchester coding mode that does not contain any DC component. In this case, an encoded signal contains no DC component and thus can be transmitted by being superimposed on a power supply. The configuration of a mobile terminal 230 obtained by applying the mobile terminal 130 to a power line transmission method will be described.

(Function Configuration)

Figure 4:
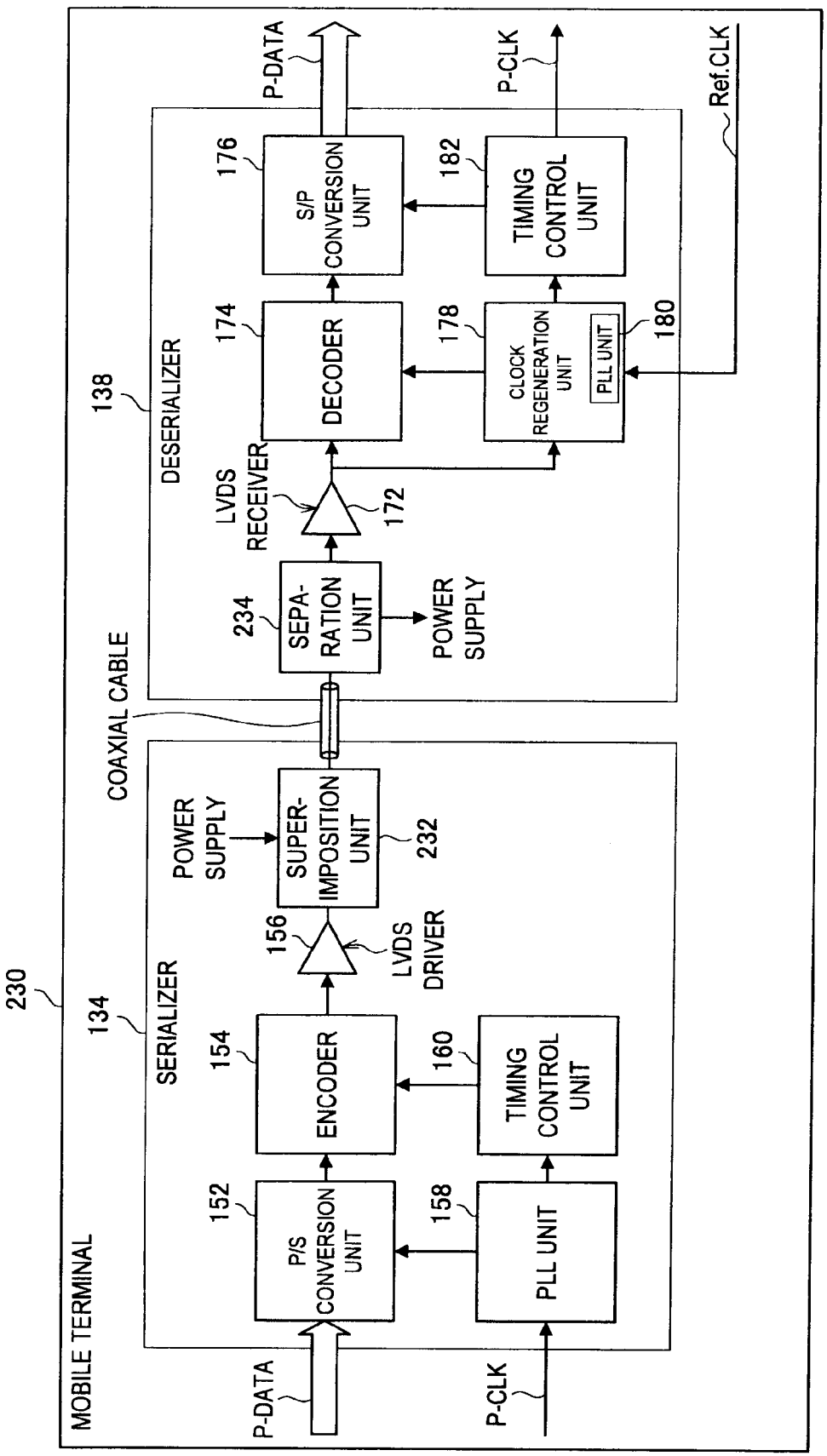
FIG. 4 shows a function configuration example of the mobile terminal involved in serial transmission.

First, the function configuration of the mobile terminal 230 capable of transmitting data using a power line will be described with reference to FIG. 4. FIG. 4 is an explanatory view exemplifying the function configuration of the mobile terminal 230 capable of transmitting data using a power line. However, FIG. 4 is an explanatory view drawn by focusing on the function configuration of the serializer 134 and the deserializer 138 and other components are not described. The same reference numerals are attached to, among components of the mobile terminal 230, components having substantially the same function as those of the mobile terminal 130 and a detailed description thereof is not described.

(The Serializer 134)

The serializer 134 includes the P/S conversion unit 152, the encoder 154, the LVDS driver 156, the PLL unit 158, the timing control unit 160, and a superimposition unit 232.

Parallel signals (P-DATA) and a clock for parallel signals (P-CLK) are input from the baseband processor 110 into the serializer 134. The parallel signals input into the serializer 134 are converted into a serial signal by the P/S conversion unit 152. The serial signal converted by the P/S conversion unit 152 is input into the encoder 154. The encoder 154 adds a header and the like to the serial signal and encodes the serial signal by a method such as the Manchester coding mode that has no DC component (or a small amount of DC component). The signal output from the encoder 154 is input into the LVDS driver 156.

The LVDS driver 156 converts the input serial signal into a LVDS, which is input into the superimposition unit 232. The superimposition unit 232 transmits the signal input from the LVDS driver 156 to the deserializer 138 by superimposing the signal on a power line. For example, the superimposition unit 232 couples the signal by a capacitor and a power supply by a chalk coil. Then, the signal superimposed on the power supply by the superimposition unit 232 is input into the deserializer 138 through the power line. The power line is a line provided to supply power from the operation unit 108 to the display unit 102. For example, a coaxial cable is used as a transmission line for the power line.

The clock for parallel signals input into the serializer 134 is input into the PLL unit 158. The PLL unit 158 generates a clock for a serial signal from the clock for parallel signals and inputs the clock for a serial signal into the P/S conversion unit 152 and the timing control unit 160. The timing control unit 160 controls transmission timing of a serial signal by the encoder 154 based on the input signal for a serial signal.

(The Deserializer 138)

The deserializer 138 mainly includes the LVDS receiver 172, the decoder 174, the S/P conversion unit 176, the clock reproduction unit 178, the PLL unit 180, the timing control unit 182, and a separation unit 234.

Figure 5:
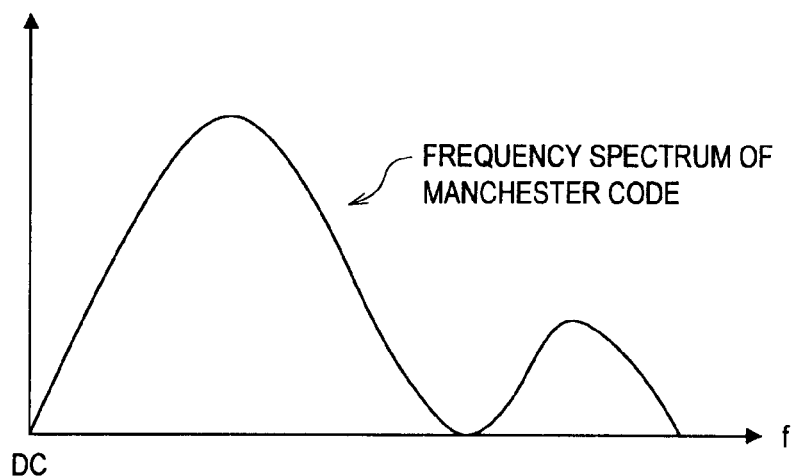
FIG. 5 exemplifies a frequency spectrum of a Manchester code.

A signal obtained by superimposing a serial signal on a power supply is input into the deserializer 138 through the power line (coaxial cable). The frequency spectrum of the superimposed signal is as shown in FIG. 5. As shown in FIG. 5, the frequency spectrum of a Manchester code has no DC component. Thus, it is clear from FIG. 5 that a transmission signal (encoded signal) of data encoded in the Manchester coding mode can be transmitted together with a power supply (DC).

FIG. 4 will be referenced again. The superimposed signal is separated into a serial signal and a power supply by the separation unit 234. For example, the separation unit 234 extracts a serial signal by cutting off a DC component using a capacitor and extracts a power supply by cutting off high-frequency components using a chalk coil. The serial signal separated by the separation unit 234 is received by the LVDS receiver 172.

The serial signal received by the LVDS receiver 172 is input into the decoder 174 and the clock reproduction unit 178. The decoder 174 detects a starting portion of data by referencing the header of the input serial signal, decodes the serial signal encoded in the Manchester coding mode, and inputs the decoded serial signal into the S/P conversion unit 176. The S/P conversion unit 176 converts the input serial signal into parallel signals (P-DATA). The parallel signals converted by the S/P conversion unit 176 are output to the liquid crystal unit 104.

On the other hand, the clock reproduction unit 178 references a reference clock input from outside and uses the built-in PLL unit 180 to reproduce a clock for parallel signals from a clock for a serial signal. The clock for parallel signals reproduced by the clock reproduction unit 178 is input into the decoder 174 and the timing control unit 182. The timing control unit 182 controls reception timing based on the clock for parallel signals input from the clock reproduction unit 178. The clock for parallel signals (P-CLK) input into the timing control unit 182 is output to the liquid crystal unit 104.

Thus, the mobile terminal 230 can transmit a power supply and a serial signal (such as an image signal) by one coaxial cable. Thus, only one wire connects the operation unit 108 and the display unit 102 so that mobility of the display unit 102 can be improved and the mobile terminal 230 can be deformed into a complex shape. As a result, more uses of the mobile terminal 230 can be found and user convenience is improved.

(Summary 1 of Issues)

As described above, in order to freely change the relative spatial relationship between the operation unit 108 and the display unit 102, the parallel transmission method is inconvenient like the case of the mobile terminal 100 described above. Thus, like the above mobile terminal 130, serial transmission of an image signal or the like is enabled by providing the serializer 134 and the deserializer 138 to increase the movable range of the display unit 102. Further, mobility of the display unit 102 is further improved by using a method of transmission by which a signal is superimposed on a power supply line for transmission by making use of characteristics of the coding mode used by the mobile terminal 130.

However, as shown in FIGS. 3 and 4, the mobile terminals 130 and 230 are provided with the PLL unit 180 (PLL) to reproduce a clock of a received serial signal. It is necessary to have the PLL to extract a clock from a signal encoded in the Manchester coding mode or the like. However, power consumption by the PLL is not low. Thus, providing the PLL increases power consumption of the mobile terminals 130 and 230 accordingly. Such an increase in power consumption poses a very serious issue for a small apparatus such as a mobile phone.

Regarding the above technical issue, a method of eliminating the need for PLL in the deserializer 138 is demanded. In response to such a demand, a new signal transmission method that transmits a signal by using a "code that does not contain any DC component and needs no PLL during clock reproduction" was recently developed. The technology according to an embodiment of the present invention described below is a technology based on this new signal transmission method. Thus, the new signal transmission method will be described here. In the description that follows, the new signal transmission method may be called the new mode.

<Basic Technology: New Mode>

The new signal transmission method (new mode) that transmits a signal by using a code that does not contain any DC component and capable of reproducing a clock without using PLL will be described below. First, characteristics of an Alternate Mark Inversion (AMI) code forming the foundation for describing the encoding method in the new mode will be briefly described. Then, the function configuration of a mobile terminal 300 according to the new mode and an encoding/decoding method according to the new mode will be described.

(Signal Waveform of AMI Code)

Figure 6:
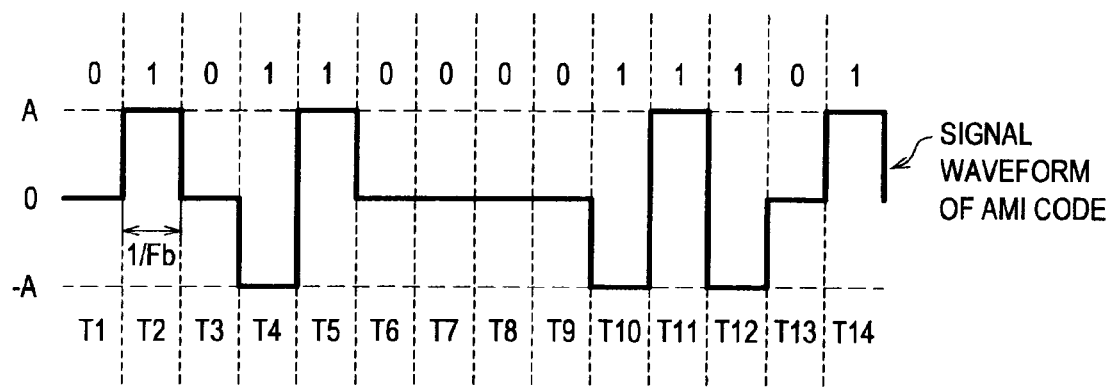
FIG. 6 exemplifies a signal waveform of an AMI code.

First, a signal waveform of AMI code and features thereof will be briefly described with reference to FIG. 6. FIG. 6 is an explanatory view showing an example of the signal waveform of AMI code. However, it is assumed in the description below that A is any positive number.

The AMI code is a code that represents data 0 as the potential 0 and data 1 as the potential A or −A. However, the potential A and the potential −A are alternately repeated. That is, if data 1 appears after the potential A is represented by data 1, the data 1 is represented by the potential −A. Since data is represented by repeating polarity reversal in this manner, the AMI code does not contain any direct-current component.

A partial response method represented, for example, by PR (1, −1) is known as code having features of the same type as the AMI code. Such a transmission code using polarity reversal is called bipolar code. In addition, a dicode mode can also be used. Here, an example of AIM code with 100% duty will be taken for a description that follows.

FIG. 6 schematically shows an AIM code of bit intervals T1, T2, T14. In FIG. 6, data 1 appears in bit intervals T2, T4, T5, T10, T11, T12, and T14. If the potential in the bit interval T2 is A, the potential in the bit interval T4 becomes −A. The potential in the bit interval T5 becomes A. In this manner, the amplitude corresponding to data 1 is alternately reversed to the positive and negative sides. This is the polarity reversal described above.

Data 0, on the other hand, is all represented by the potential 0. With representations described above, the AMI code does not contain any direct-current component, but as observed in the bit intervals T6, . . . , T9 in FIG. 6, the potential 0 may appear consecutively. If the potential 0 continues in this manner, there is an issue that is it very difficult to extract a clock component from such a signal waveform without using the PLL. Thus, the present embodiment proposes a technology to cause AMI code (and code having features equivalent thereto) to include a clock component.

Therefore, according to the new mode, a technology to cause an AMI code (and any code having characteristics equivalent thereto) to include a clock component for transmission is used. The technology will be described below.

(Function Configuration)

Figure 7:
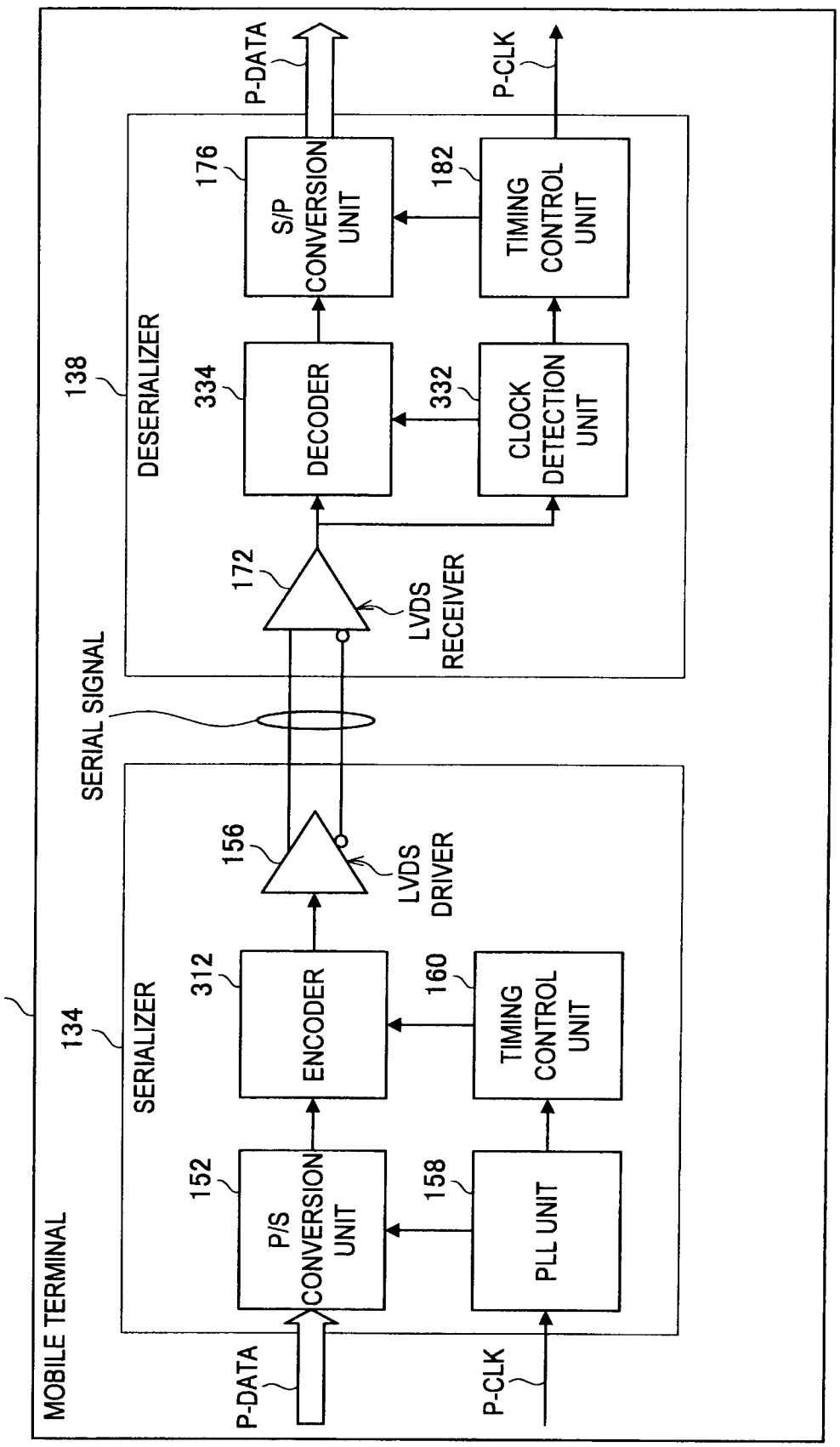
FIG. 7 shows a function configuration example of the mobile terminal according to a new mode.

Next, the function configuration of the mobile terminal 300 according to the new mode will be described with reference to FIG. 7. FIG. 7 is an explanatory view illustrating a function configuration example of the mobile terminal 300 according to the new mode. However, FIG. 7 is an explanatory view drawn by focusing on the function configuration of the serializer 134 and the deserializer 138 and other components are not described. The same reference numerals are attached to, among components of the mobile terminal 300, components having substantially the same function as those of the mobile terminal 130 described above and a detailed description thereof is not described.

(The Serializer 134)

The serializer 134 includes the P/S conversion unit 152, the LVDS driver 156, the PLL unit 158, the timing control unit 160, and an encoder 312. A main difference between the mobile terminal 130 described above and the serializer 134 is the function held by the encoder 312.

First, parallel signals (P-DATA) and a clock for parallel signals (P-CLK) are input from the baseband processor 110 into the serializer 134. The parallel signals input into the serializer 134 are converted into a serial signal by the P/S conversion unit 152. The serial signal converted by the P/S conversion unit 152 is input into the encoder 312. The encoder 312 adds a header and the like to the serial signal and encodes the serial signal based on the predetermined coding mode (new mode) to generate an encoded signal.

Figure 8:
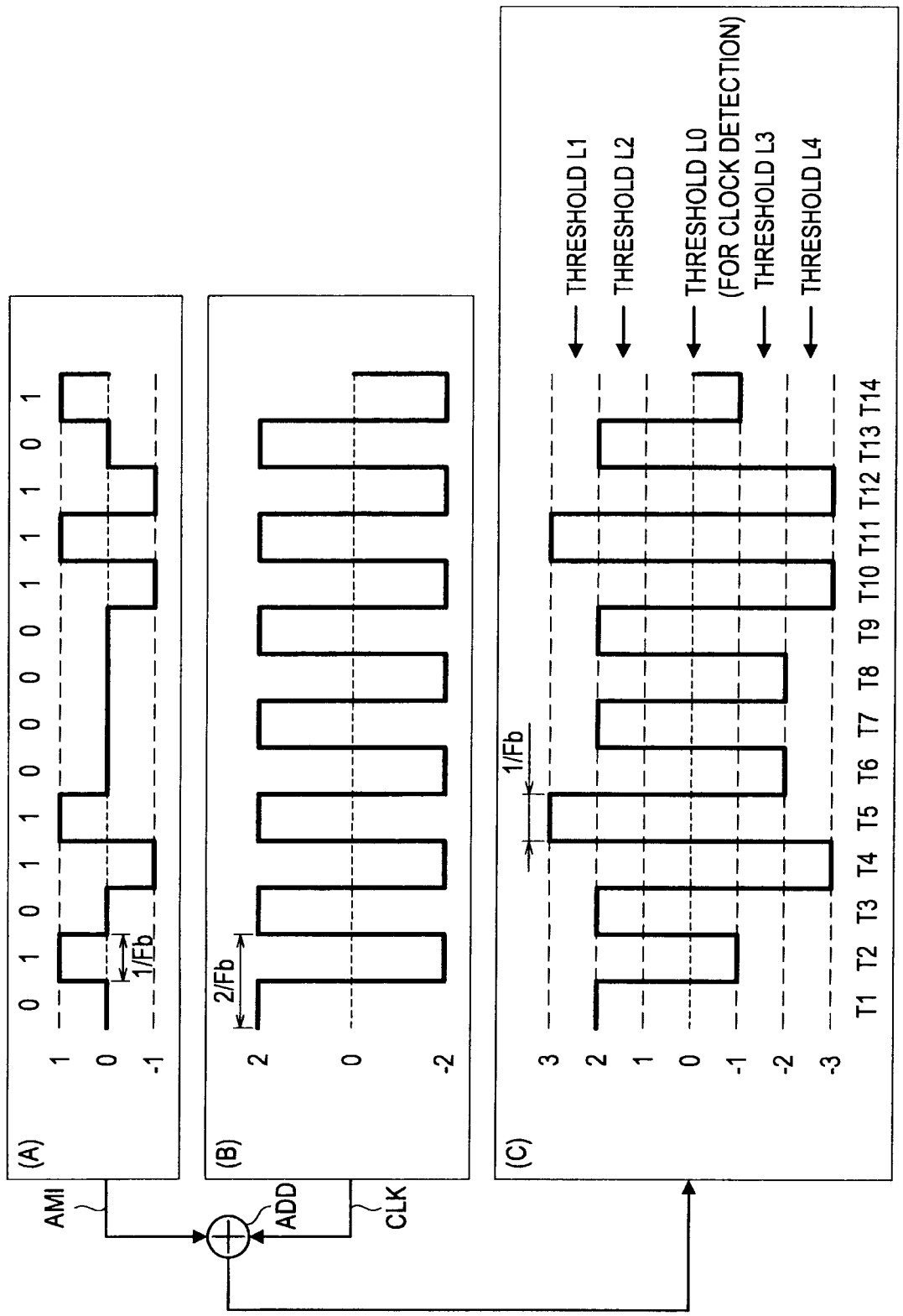
FIG. 8 shows a signal generation method according to the new mode.

Here, the encoding method in the new mode by the encoder 312 will be described with reference to FIG. 8. FIG. 8 is an explanatory view exemplifying the encoding method according to the new mode. FIG. 8 shows a generation method of a code based on the AMI code. However, the technology according to the new mode is not limited to this and is applied to any code having characteristics similar to those of the AMI code in the same manner. The technology is applicable to, for example, a bipolar code and a code in partial response mode.

The signal illustrated in (A) is obtained by encoding input data based on the AMI coding mode. On the other hand, the signal illustrated in (C) is a signal encoded by the encoding method of the new mode based on the signal in (A). In this signal, data 1 is represented by a plurality of potentials A1 (−1, −3, 1, 3) and data 0 is represented by a plurality of potentials A2 (−2, 2) that are different from the potentials A1. The signal is formed to reverse its polarity in each period and not to take the same potential consecutively.

For example, a section in which data 0 continues is present in the bit intervals T6 to T9 in (A) and is represented as a consecutive section of the potential 0, but in (C), the potential changes like −2, 2, −2, 2 in the same section. Thus, the signal in (C) is formed in such a way that, even if the same data value appears consecutively, the polarity thereof is reversed in each period. Thus, if the signal in (C) is used for data transmission, a clock component can be reproduced by detecting both rising and falling edges on the receiving side. The method of generating the signal in (C) will be described below.

The encoder 312 is provided with an adder ADD to generate a code such as the above code shown in (C). For example, the encoder 312 inputs an input serial signal into the adder ADD after the serial signal being encoded into an AMI code (A). Further, the encoder 312 generates a clock (B) having a frequency (Fb/2) that is half that of an AMI code having a transmission speed Fb and inputs the clock (B) into the adder ADD. The amplitude of the clock is assumed to be N times (N>1; N=2 in the example in FIG. 8) that of the AMI code. Then, the encoder 312 generates a code (C) by adding the AMI code and the clock using the adder ADD. At this point, the AMI code and the clock are synchronized and edges thereof are aligned before being added.

FIG. 7 will be referenced again. The serial signal encoded by the encoder 312 is input into the LVDS driver 156. The LVDS driver 156 transmits the input serial signal to the deserializer 138 by the differential transmission method using the LVDS. Incidentally, the clock for parallel signals input into the serializer 134 is input into the PLL unit 158. The PLL unit 158 generates a clock for a serial signal from the clock for parallel signals and inputs the clock for a serial signal into the P/S conversion unit 152 and the timing control unit 160. The timing control unit 160 controls transmission timing of the serial signal by the encoder 312 based on the input clock for a serial signal.

(The Deserializer 138)

The deserializer 138 mainly includes the LVDS receiver 172, the S/P conversion unit 176, the timing control unit 182, a clock detection unit 332, and a decoder 334. A main difference between the mobile terminal 130 described above and the deserializer 138 is the function of the clock detection unit 332 having no PLL.

A serial signal is transmitted to the deserializer 138 from the serializer 134 by the differential transmission method using the LVDS. The serial signal is received by the LVDS receiver 172. The serial signal received by the LVDS receiver 172 is input into the decoder 334 and the clock detection unit 332. The decoder 334 detects a starting portion of data by referencing the header of the input serial signal and decodes the serial signal encoded by the coding mode used by the encoder 312.

Here, the decoding method by the decoder 334 will be briefly described with reference to FIG. 8. A detailed circuit configuration of the decider 334 will be described below. As described above, the serial signal is encoded into the format shown in (C) by the encoder 312. Thus, the serial signal can be decoded into the original serial signal by the decoder 334 by determining whether the amplitude of the received signal is A1 or A2. Four thresholds (L1, L2, L3, and L4) shown in FIG. 8 are used to determine the amplitude A1 (−1, −3, 1, 3) corresponding to data 1 and the amplitude A2 (−2, 2) corresponding to data 0. Thus, the decoder 334 compares the amplitude of the input signal and the above four thresholds to determine whether the amplitude is A1 or A2 to decode the serial signal into the original serial signal.

FIG. 7 will be referenced again. The serial signal decoded by the decoder 334 is input into the S/P conversion unit 176. The S/P conversion unit 176 converts the input serial signal into parallel signals (P-DATA). The parallel signals converted by the S/P conversion unit 176 are output to the liquid crystal unit 104.

On the other hand, the clock detection unit 332 detects a clock component from the signal received by the LVDS receiver 172. At this point, the clock detection unit 332 detects the period of the polarity reversal by comparing the amplitude value of the signal and the threshold L0 (potential 0) and reproduces the original clock by detecting a clock component based on the period. Thus, the clock detection unit 332 does not use any PLL when detecting a clock component from a signal. Therefore, there is no need to provide a PLL on the side of the deserializer 138 and power consumption of the deserializer 138 can be reduced.

The clock reproduced by the clock detection unit 332 is input into the decoder 334 and the timing control unit 182. The timing control unit 182 controls reception timing based on the clock input from the clock detection unit 332. The clock (P-CLK) input into the timing control unit 182 is output to the liquid crystal unit 104.

Thus, by using a code that does not contain any DC component (see FIG. 9) and capable of detecting a clock component from the polarity reversal period, the need for PLL to reproduce a clock is eliminated and therefore, power consumption of a mobile terminal can significantly be reduced. The frequency spectrum of a code used in the new mode has a shape as shown, for example, in FIG. 9. A line spectrum appears at frequency Fb/2 of the clock added by the adder ADD of the encoder 312 and in addition, a broad frequency spectrum of the AMI code appears. The frequency spectrum has null points at frequencies Fb, 2Fb, 3Fb, . . . .

(Details of Decoding Processing)

Figure 10:
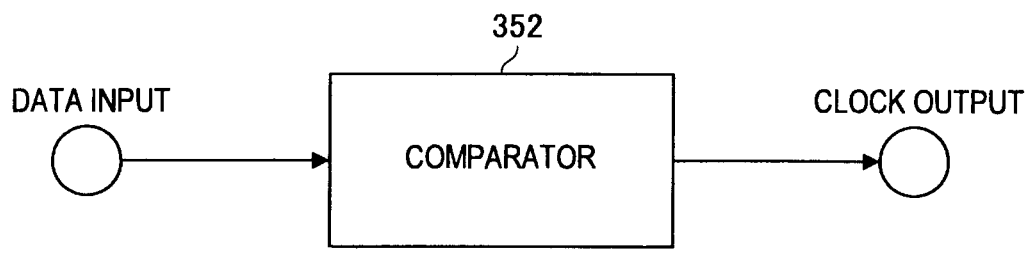
FIG. 10 shows a circuit configuration example of a clock detection unit.
Figure 11:
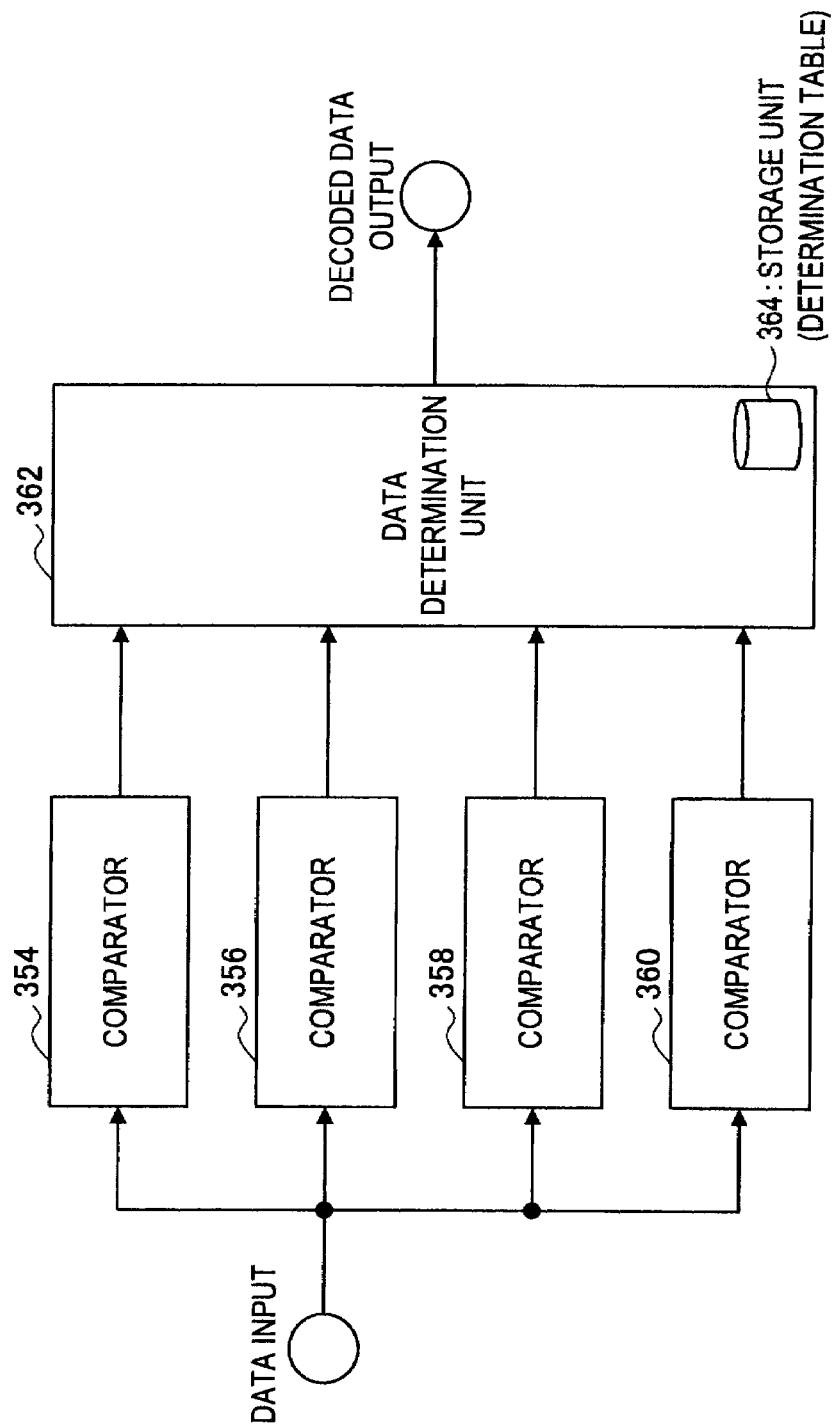
FIG. 11 shows a circuit configuration example of a decoder.
Figure 13:
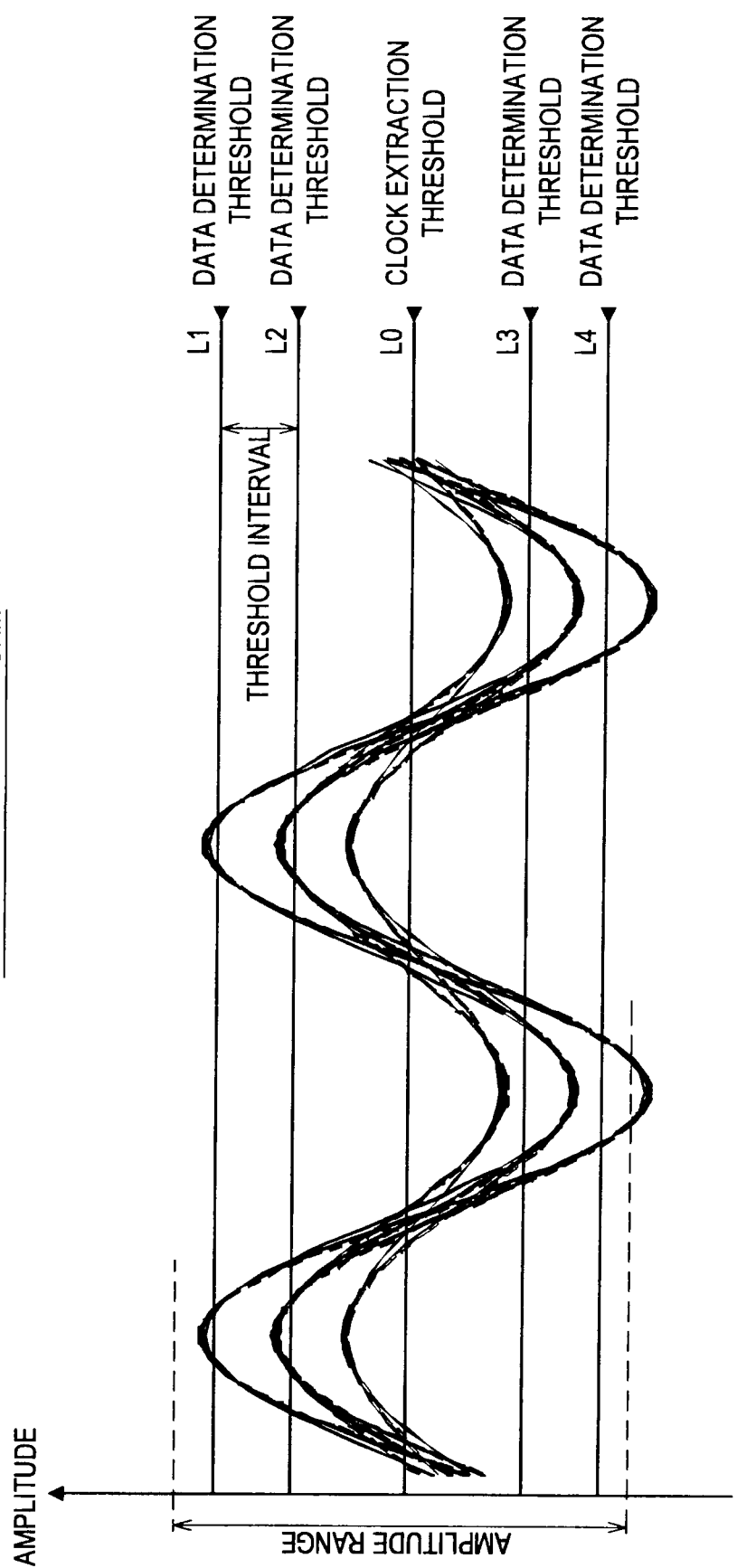
FIG. 13 shows a relationship between a received signal waveform and a data determination threshold.

Next, details of decoding processing by the new mode will be described with reference to FIGS. 10 to 13. FIG. 10 is an explanatory view illustrating a circuit configuration example of the clock detection unit 332. FIG. 11 is an explanatory view illustrating a circuit configuration example of the decoder 334. FIG. 12 is an explanatory view illustrating a configuration example of a determination table for data determination. FIG. 13 is an explanatory view illustrating a received signal waveform (an eye pattern is shown in FIG. 13) when the new mode is applied.

(Circuit Configuration Example of the Clock Detection Unit 332)

First, FIG. 10 will be referenced. As shown in FIG. 10, the function of the clock detection unit 332 is realized by a comparator 352.

The amplitude value of a signal encoded in the new mode is input into the comparator 352 as input data. After the input data is input, the comparator 352 compares the input amplitude value and a predetermined threshold. For example, the comparator 352 determines whether input data is larger than the predetermined threshold. The comparator 352 is used to extract a clock from the code in the new mode (see (C) in FIG. 8). Thus, the threshold L0 is used as the predetermined threshold.

If, for example, input data is larger than the predetermined threshold, the comparator 352 outputs a determination value (for example, 1) indicating that the input data is larger than the predetermined threshold. If, on the other hand, input data is smaller than the predetermined threshold, the comparator 352 outputs a determination value (for example, 0) indicating that the input data is not larger than the predetermined threshold.

An output result of the comparator 352 is input into the decoder 334 and the timing control unit 182 as a clock.

(Circuit Configuration Example of the Decoder 334)

Next, FIG. 11 will be referenced. As shown in FIG. 11, the function of the decoder 334 is realized by a plurality of comparators 354, 356, 358, and 360 and a data determination unit 362. The data determination unit 362 is provided with a storage unit 364. A determination table for data determination shown in FIG. 12 is stored in the storage unit 364.

The plurality of comparators 354, 356, 358, and 360 has mutually different thresholds set thereto. For example, the threshold L1 is set to the comparator 354, the threshold L2 to the comparator 356, the threshold L3 to the comparator 358, and the threshold L4 to the comparator 360. However, as shown in (C) of FIG. 8, the thresholds L1, L2, L3, and L4 satisfy the relationship L1>L2>L3>L4.

First, the amplitude value of a signal encoded in the new mode is input into the plurality of comparators 354, 356, 358, and 360. At this point, the same input data is input into the comparators 354, 356, 358, and 360 in parallel.

After the input data is input, the comparator 354 compares the input data and the threshold L1 to determine whether the input data is larger than the threshold L1. If the input data is larger than the threshold L1, the comparator 354 outputs a determination value (for example, 1) indicating that the input data is larger than the threshold L1. If, on the other hand, the input data is not larger than the threshold L1, the comparator 354 outputs a determination value (for example, 0) indicating that the input data is not larger than the threshold L1.

Similarly, the comparator 356 compares the input data and the threshold L2 to determine whether the input data is larger than the threshold L2. Also, the comparator 358 compares the input data and the threshold L3 to determine whether the input data is larger than the threshold L3. Further, the comparator 360 compares the input data and the threshold L4 to determine whether the input data is larger than the threshold L4. Determination values output from the plurality of comparators 354, 356, 358, and 360 are input into the data determination unit 362.

The data determination unit 362 determines the bit value indicated by the input data based on determination values output from the plurality of comparators 354, 356, 358, and 360. At this point, the data determination unit 362 determines the bit value indicated by the input data based on the determination table for data determination (see FIG. 12) stored in the storage unit 364. For example, the determination table for data determination shown in FIG. 12 is used as a determination table for data determination. The determination table illustrated in FIG. 12 shows the correspondence between each combination of values output from the plurality of comparators 354, 356, 358, and 360 and the bit value (0 or 1).

For example, a case when the output value of the comparator 354 is 1 will be considered. In this case, input data is larger than the threshold L1. As described above, the thresholds satisfy the relationship L1>L2>L3>L4. Thus, from the above relationship, output values from the comparators 356, 358, and 360 will also be 1. Moreover, the bit value corresponding to any amplitude having a value larger than threshold L1 is 1. Therefore, the determination table shows the correspondence between the combination in which all output values of the comparators 354, 356, 358, and 360 are 1 and the bit value of 1.

Other conditions will be considered. Here, for convenience of description, output values of the comparators 354, 356, 358, and 360 are denoted as d1, d2, d3, and d4 respectively and a combination thereof as (d1, d2, d3, d4). For example, the combination of (d1, d2, d3, d4)=(0, 1, 1, 1) means that input data d satisfies L1>d>L2. If input data is L1>d>L2, the bit value is 0.

Similarly, the combination of (d1, d2, d3, d4)=(0, 0, 1, 1) means that input data d satisfies L2>d>L3. If input data is L2>d>L3, the bit value is 1. The combination of (d1, d2, d3, d4)=(0, 0, 0, 1) means that input data d satisfies L3>d>L4. If input data is L3>d>L4, the bit value is 0. Further, the combination of (d1, d2, d3, d4)=(0, 0, 0, 0) means that input data d satisfies L4>d. If input data is L4>d, the bit value is 1.

As described above, summarization of correspondences between various combinations and bit values to associate such combinations of output values output from each of the comparators 354, 356, 358, and 360 and the bit values is the determination table illustrated in FIG. 12. That is, the determination table shows a determination algorithm of the bit value determination by the data determination unit 362. Based on the determination table, the data determination unit 362 determines the bit value from the combination of the output value output from the plurality of comparators 354, 356, 358, and 360. The bit value determined by the data determination unit 362 is input into the S/P conversion unit 176.

(Summary 2 of Issues)

Thus, it is necessary to have one comparator 352 included in the clock detection unit 332 and the four comparators 354, 356, 358, and 360 included in the decoder 334 to decode a code in the new mode. As described above, a code according to the new mode is very excellent in the sense that the code does not contain any DC component and is capable of reproducing a clock without using a PLL circuit. However, it is necessary to have a total of five comparators only to determine two bit values. As a result, the circuit scale grows and power consumption increases.

Further, determination processing is performed by providing five thresholds in the amplitude direction and thus, if the maximum width (amplitude range) of the signal amplitude is fixed, as shown in FIG. 13, the interval between individual thresholds will be narrower. As a result, a higher level of setting precision of the threshold and determination precision of the bit value will be demanded. In recent years, semiconductor processes become increasingly finer, leading to lower operating voltages. Accordingly, the amplitude range of a signal is becoming increasingly smaller. Moreover, it is necessary that the maximum and minimum values of the signal amplitude fall within the range of the operating voltage, as described above, in order to use a code having a plurality of bit values in the amplitude direction. Under such circumstances, it is necessary to set thresholds with very high setting precision to perform determination processing of data by providing five thresholds in the amplitude direction, which is not so realistic.

In view of such technical issues, an object of an embodiment described below is to reduce the circuit scale by reducing the number of comparators (number of thresholds) used for decoding a code according to the new mode and also to realize relaxation of setting precision of the thresholds. Needless to say, the embodiment described below will also solve the issue described above (Summary 1 of issues). An embodiment capable of achieving such an object will be described below.

Figure 9:
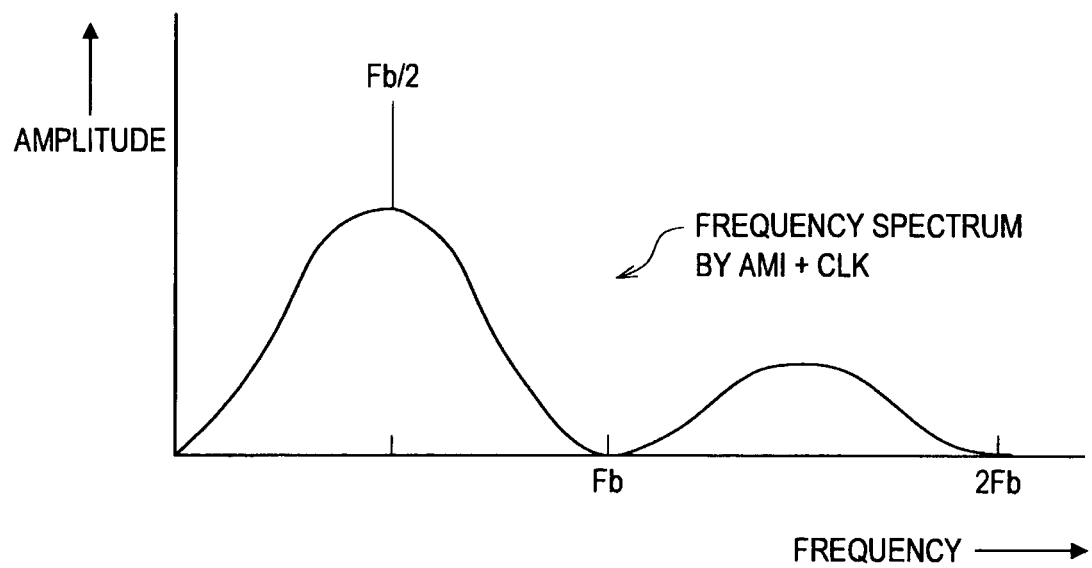
FIG. 9 exemplifies the frequency spectrum of a signal according to the new mode.

The technology according to the embodiment concerns a technology that efficiently removes a line spectrum corresponding to a clock component on the frequency axis and reduces the number of thresholds. However, as shown in FIG. 9, a line spectrum corresponding to a clock component appears in a peak portion of the frequency spectrum of AMI code in the above example. Thus, it is very difficult to remove only a clock component on the frequency axis while maintaining an AMI code component. Thus, in the embodiment, a technology to make it possible to easily remove a clock component from the frequency axis while maintaining effects obtained by the new mode.

Embodiment

An embodiment of the present invention will be described. The present embodiment is intended to reduce the number of times of threshold determination processing performed when bit values are decoded from a code that does not contain any DC component and needs no PLL circuit during clock reproduction. Particularly, the present embodiment is based on the technology according to the above new mode and concerns a technology that efficiently removes a clock signal on the receiving side.

[Configuration of a Mobile Terminal 400]

First, the function configuration of the mobile terminal 400 according to the present embodiment will be described with reference to FIG. 14. FIG. 14 is an explanatory view illustrating a function configuration example of the mobile terminal 400 according to the present embodiment. However, FIG. 14 is an explanatory view drawn by focusing on the function configuration of the serializer 134 and the deserializer 138 and other components are not described. The same reference numerals are attached to, among components of the mobile terminal 400, components having substantially the same function as those of the mobile terminal 300 described above and a detailed description thereof is not described.

(The Serializer 134)

The serializer 134 includes the P/S conversion unit 152, the driver 156, the PLL unit 158, the timing control unit 160, the superimposition unit 232, and an encoder 402. The serializer 134 in the mobile terminal 400 is substantially the same as that in the mobile terminal 300 except that the superimposition unit 232 is provided and the function of the encoder 402 is improved. The function configuration of the superimposition unit 232 is substantially the same as that provided in the mobile terminal 230.

First, parallel signals (P-DATA) and a clock for parallel signals (P-CLK) are input from the baseband processor 110 into the serializer 134. The parallel signals input into the serializer 134 are converted into a serial signal by the P/S conversion unit 152. The serial signal converted by the P/S conversion unit 152 is input into the encoder 402. The encoder 402 adds a header and the like to the serial signal and encodes the serial signal based on the coding mode in the present embodiment to generate an encoded signal. The coding mode will be described below in detail.

The encoded signal generated by the encoder 402 is input into the driver 156. The driver 156 converts the input serial signal into a LVSD and then inputs the LVSD into the superimposition unit 232. The superimposition unit 232 transmits the signal input from the driver 156 to the deserializer 138 by superimposing the signal on a power line. For example, the superimposition unit 232 couples the signal by a capacitor and a power supply by a chalk coil. Then, the signal superimposed on the power supply by the superimposition unit 232 is input into the deserializer 138 through the power line.

The clock for parallel signals input into the serializer 134 is input into the PLL unit 158. The PLL unit 158 generates a clock for a serial signal from the clock for parallel signals and inputs the clock for a serial signal into the P/S conversion unit 152 and the timing control unit 160. The timing control unit 160 controls transmission timing of the serial signal by the encoder 402 based on the input clock for a serial signal.

(The Deserializer 138)

The deserializer 138 mainly includes the separation unit 234, the receiver 172, the S/P conversion unit 176, the timing control unit 182, and a decoding processing unit 432. The decoding processing unit 432 includes a decoder 434 and a clock detection unit 436. Like the above mobile terminal 300, the clock detection unit 436 is not provided with any PLL. A main difference between the deserializer 138 of the mobile terminal 300 and the mobile terminal 400 lies in the decoding processing method by the decoding processing unit 432.

First, a signal obtained by superimposing a serial signal on a power supply is input into the deserializer 138 through a power line (coaxial cable). The superimposed signal is separated into a serial signal and a power supply by the separation unit 234. For example, the separation unit 234 extracts a serial signal by cutting off a DC component using a capacitor and a power supply by cutting off high-frequency components using a chalk coil. The serial signal separated by the separation unit 234 is received by the receiver 172.

The serial signal received by the receiver 172 is input into the decoder 434 and the clock detection unit 436 included in the decoding processing unit 432. The decoder 434 detects a starting portion of data by referencing the header of the input serial signal and decodes the serial signal encoded by the coding mode used by the encoder 402. The serial signal decoded by the decoder 434 is input into the S/P conversion unit 176. The S/P conversion unit 176 converts the input serial signal into parallel signals (P-DATA). The parallel signals converted by the S/P conversion unit 176 are output to the liquid crystal unit 104.

On the other hand, the clock detection unit 436 detects a clock component from the signal received by the receiver 172. At this point, the clock detection unit 436 detects the period of the polarity reversal by comparing the amplitude value of the signal and the threshold L0 (potential 0) and reproduces the original clock by detecting a clock component based on the period. Then, the clock reproduced by the clock detection unit 436 is input into the decoder 434 and the timing control unit 182. The timing control unit 182 controls reception timing based on the clock input from the clock detection unit 436. The clock (P-CLK) input into the timing control unit 182 is output to the liquid crystal unit 104.

In the foregoing, the overall function configuration of the mobile terminal 400 according to the present embodiment and the overall flow of signal processing have been briefly described. Detailed functions of the encoder 402 and the decoder 434, which are characteristic components of the present embodiment, and details on the signal processing method will be described below.

[Encoding Processing by the Encoder 402]

Figure 15:
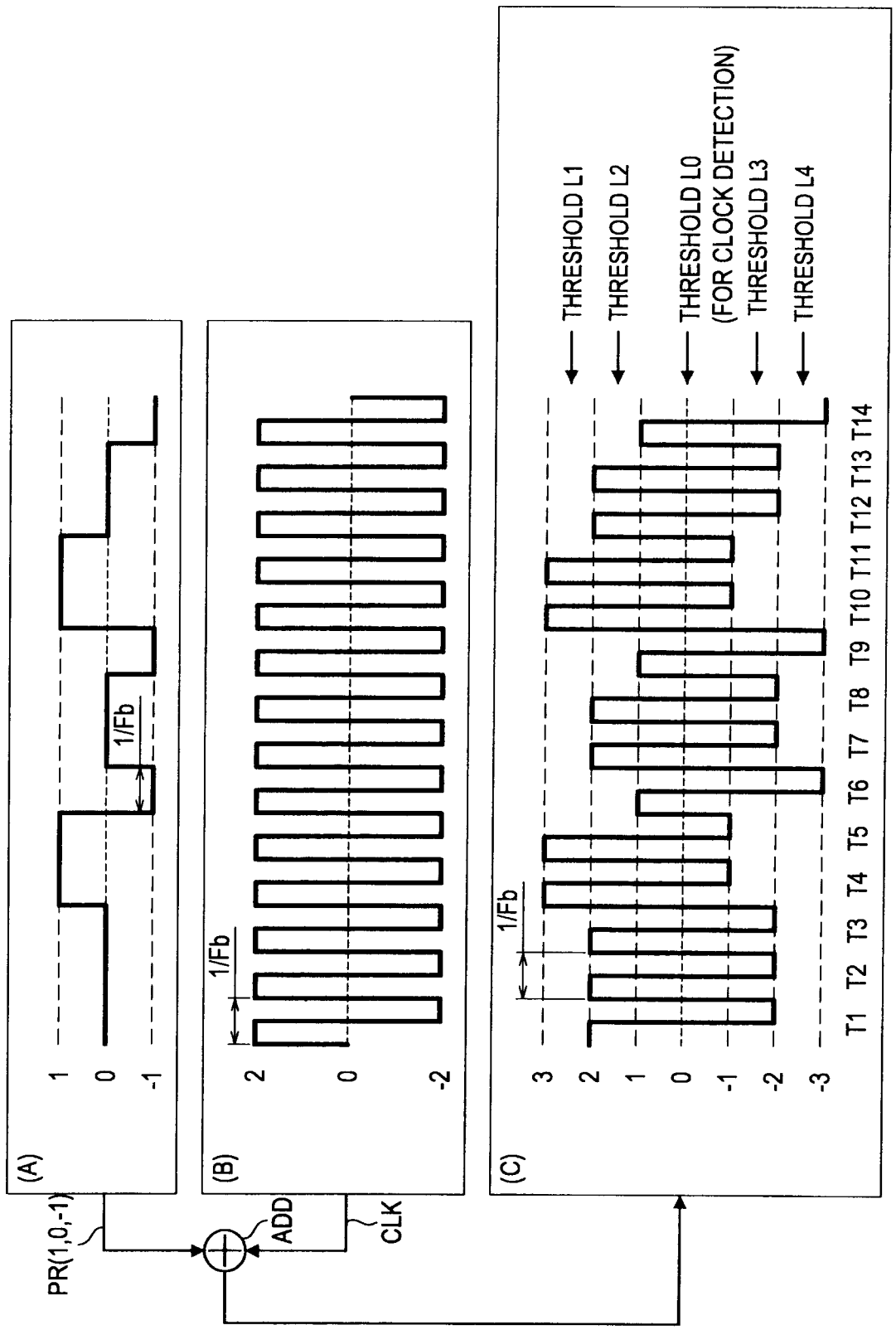
FIG. 15 exemplifies the signal generation method according to the present embodiment.

First, encoding processing by the encoder 402 will be described with reference to FIG. 15. FIG. 15 is an explanatory view exemplifying the encoding method according to the present embodiment. In FIG. 15, the generation method of a code based on a code PR (1, 0, −1) in partial response mode is shown. However, technology according to the present embodiment is not limited to this and can be applied similarly to PR (1, 0, 0, −1) and PR (1, 0, . . . , 0, −1).

The signal shown in (A) is obtained by encoding input data based on the PR (1, 0, −1) coding mode. On the other hand, the signal shown in (C) is a signal encoded by the encoding method in the present embodiment based on the signal in (A). In this signal, data 1 is represented by a plurality of potentials A1 (−1, −3, 1, 3) and data 0 is represented by a plurality of potentials A2 (−2, 2) that are different from the potentials A1.

The signal is formed to reverse its polarity in each period and not to take the same potential consecutively.

For example, a section in which the potential 0 continues is present in a bit interval T1 to T3 in (A). However, in (C), the potential changes like −2, 2, . . . , −2, 2 in the same section. Thus, the signal in (C) is formed in such a way that the polarity thereof is reversed in each period not to take the same potential consecutively. Thus, if the signal in (C) is used for data transmission, a clock component can be reproduced by detecting both rising and falling edges on the receiving side. The method of generating the signal in (C) will be described below.

The encoder 402 is provided with the adder ADD for generating a code like in (C) shown above. For example, the encoder 402 inputs an input serial signal into the adder ADD after the serial signal being encoded into a PR (1, 0, −1) code (A). Further, the encoder 402 inputs a clock (B) having the same frequency Fb as the transmission speed Fb of the PR (1, 0, −1) code (A) having the transmission speed Fb into the adder ADD. The amplitude of the clock is assumed to be N times (N>1; N=2 in the example in FIG. 15) that of the PR (1, 0, −1) code (A). The encoder 402 generates a code (C) by adding the PR (1, 0, −1) code (A) and the clock (B) by the adder ADD. At this point, the PR (1, 0, −1) code (A) and the clock (B) are synchronized and edges thereof are aligned before being added.

Figure 16:
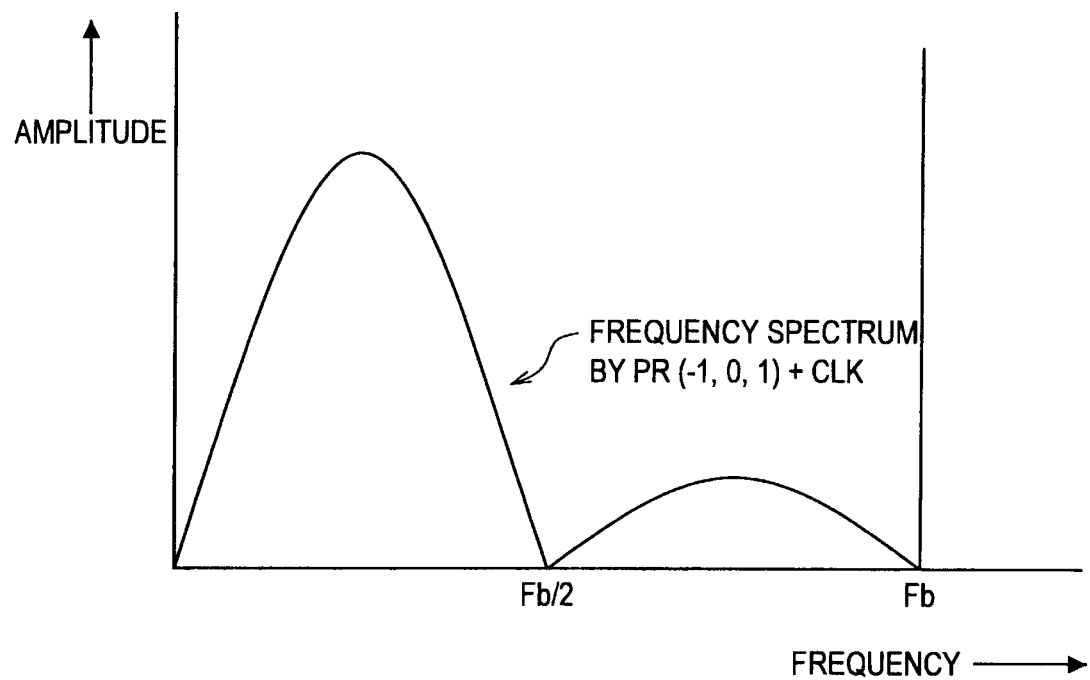
FIG. 16 exemplifies the frequency spectrum of a signal according to the present embodiment.

The frequency spectrum of the code (C) generated by the above encoding method looks, for example, like a shape shown in FIG. 16. A line spectrum appears at frequency Fb of the clock (B) added by the adder ADD of the encoder 402 and in addition, a broad frequency spectrum of the PR (1, 0, −1) code (A) appears. In the frequency spectrum corresponding to a code on the new mode shown in FIG. 9, a line spectrum corresponding to a clock appears at Fb/2. Thus, the line spectrum is positioned in the center of the first peak of a broad frequency spectrum of the AMI code and it is very difficult to remove the line spectrum on the frequency axis without significantly affecting the frequency spectrum of the AMI code.

On the other hand, the line spectrum appearing in the frequency spectrum of the code (C) according to the present embodiment is positioned outside the second peak of the broad frequency spectrum of the PR (1, 0, −1) code (A). Thus, the line spectrum on the frequency axis can be removed from the code (C) according to the present embodiment without significantly affecting PR (1, 0, −1) code (A). The frequency spectrum of the code (C) has a shape shown in FIG. 16 because the clock (B) that has the same frequency Fb as the transmission speed Fb of the PR (1, 0, −1) code (A) is added. The PR (1, 0, −1) code (A) is used, instead of the AMI code, so as to make transmission possible after the clock (B) of the frequency Fb being added. However, instead of the PR (1, 0, −1) code, codes such as PR (1, 0, 0, −1), PR (1, 0, 0, 0, −1), and PR (1, 0, . . . , 0, −1) may be used.

[Encoding Processing/Decoding Processing in PR (1, 0, −1) Mode]

Figure 17:
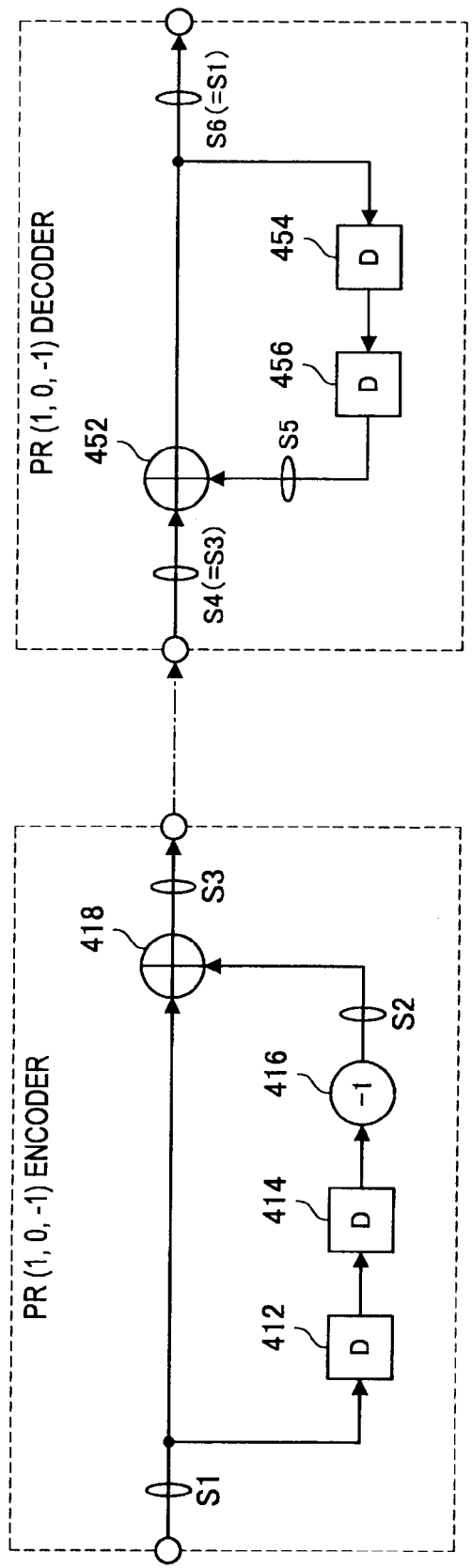
FIG. 17 shows a circuit configuration example of an encoder and decoder according to a partial response mode.

Here, encoding processing and decoding processing in PR (1, 0, −1) mode will be briefly described with reference to FIG. 17. FIG. 17 is an explanatory view illustrating a circuit configuration example to realize a sequence of encoding processing and decoding processing according to the PR (1, 0, −1) mode.

(Encoding Processing)

First, encoding processing will be described. As shown in FIG. 17, an encoder (hereinafter, a PR (1, 0, −1) encoder) in PR (1, 0, −1) mode includes two delay circuits 412 and 414, a "−1" multiplier 416, and an adder 418. When input data S1 is input into the PR (1, 0, −1) encoder, the input data S1 is input into the delay circuit 412 and the adder 418. In the delay circuit 412, the input data S1 is delayed by 1 bit. Output data of the delay circuit 412 is input into the delay circuit 414 and the input data S1 is further delayed by 1 bit. Then, output data of the delay circuit 414 is input into the "−1" multiplier 416.

In the "−1" multiplier 416, the output data of the delay circuit 414 is multiplied by −1. Then, output data S2 of the "−1" multiplier 416 is input into the adder 418. In the adder 418, the input data S1 and the output data S2 of the "−1" multiplier 416 are added. Then, output data S3 of the adder 418 is transmitted to a decoder (hereinafter, a PR (1, 0, −1) decoder) in PR (1, 0, −1) mode. Processing by the PR (1, 0, −1) encoder is represented, as shown, for example, in FIG. 18.

FIG. 18 illustrates the data S1, S2, and S3 obtained in processing by the PR (1, 0, −1) encoder. As shown in FIG. 18, when the input data S1 is input, each bit of the input data S1 is delayed by 2 bits and each bit value is multiplied by −1 to generate the data S2. In FIG. 18, however, the bit value 0 contained in the data S2 is not described to make the field blank. Further, the data S1 and the data S2 are added to obtained the data S3. In this manner, the code (A) in PR (1, 0, −1) mode is generated.

(Decoding Processing)

Next, decoding processing will be described. As shown in FIG. 17, the PR (1, 0, −1) decoder in PR (1, 0, −1) mode includes an adder 452 and two delay circuits 454 and 456. First when data S4 (=S3) is input into the PR (1, 0, −1) decoder, the data S4 is input into the adder 452. Output data of the adder 452 is input into the delay circuit 454 and delayed by 1 bit.

Further, output data of the delay circuit 454 is input into the delay circuit 456 and further delayed by 1 bit. Output data S5 of the delay circuit 456 is input into the adder 452. The adder 452 adds the data S4 and the output data S5 of the delay circuit 456. Output data S6 (=S1) of the adder 452 is reproduced data of the data S1 input into the PR (1, 0, −1) encoder. In this manner, the data S1 before encoding is reproduced. Processing by the PR (1, 0, −1) decoder is represented, as shown, for example, in FIG. 19.

FIG. 19 corresponds to processing to decode the data S3 in FIG. 18. FIG. 19 illustrates the data S4, S5, and S6 obtained in processing by the PR (1, 0, −1) decoder. As shown in FIG. 19, when the input data S4 is input, each bit of the output data S6 of the adder 452 is delayed by 2 bits to generate the data S5. Further, the data S4 and the data S5 are added to obtain the data S6. Reference to FIG. 18, in addition to FIG. 19, shows that the data S6 matches the data S1 shown in FIG. 18. In this manner, the code (A) in PR (1, 0, −1) mode is reproduced.

In the foregoing, encoding processing/decoding processing in PR (1, 0, −1) mode has been described. In the present embodiment, processing corresponding to the above PR (1, 0, −1) encoder is performed by the encoder 402 and then, a clock is added and transmitted. On the other hand, processing corresponding to the above PR (1, 0, −1) decoder is performed by the decoder 434 described below.

[Decoding Processing by the Decoder 434]

Next, decoding processing by the decoder 434 will be described with reference to FIGS. 20 and 21. FIG. 20 is an explanatory view illustrating a circuit configuration example of the decoder 434 capable of performing decoding processing according to the present embodiment. FIG. 21 is an explanatory view illustrating the function of a band-elimination filter 472 contained in the circuit configuration example of the decoder 434 shown in FIG. 20.

Figure 20:
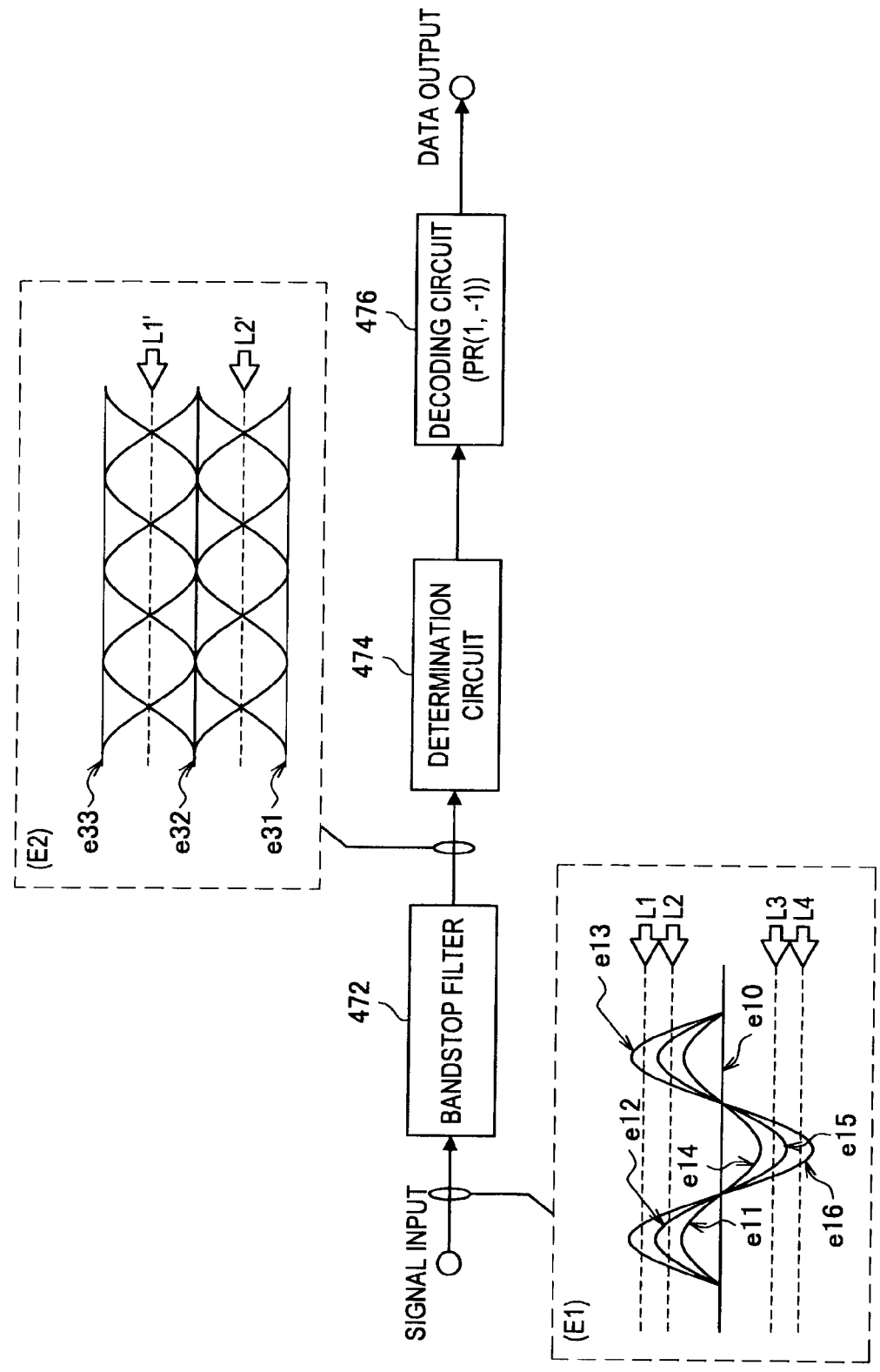
FIG. 20 shows a circuit configuration example of the decoder according to the present embodiment.
Figure 21:
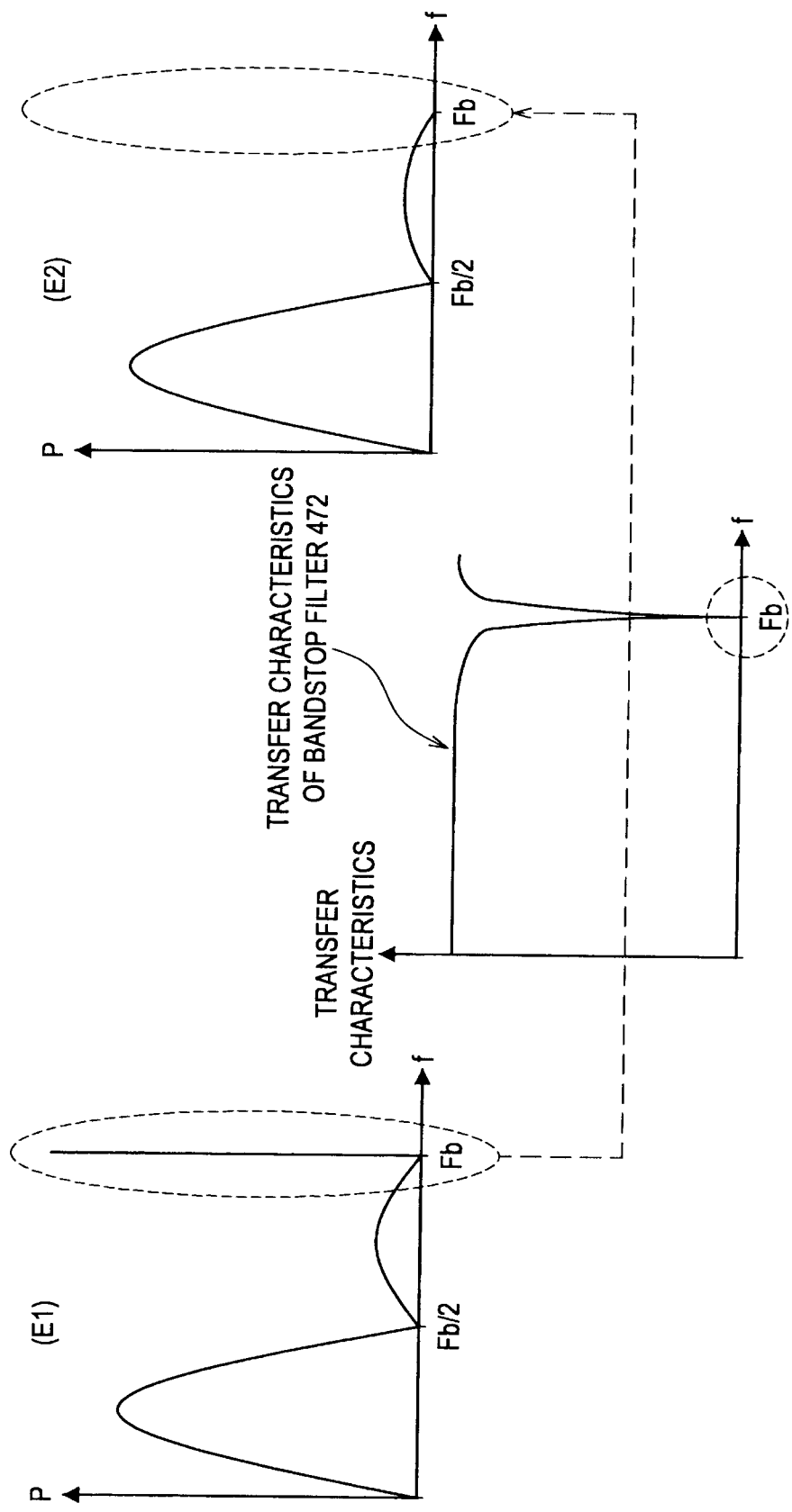
FIG. 21 shows transfer characteristics of a band-elimination filter according to the present embodiment.

First, FIG. 20 will be referenced. As shown in FIG. 20, the decoder 434 includes the band-elimination filter 472, a determination circuit 474, and a decoding circuit 476. FIG. 20 also shows the waveform of a signal (E1) prior to the band-elimination filter 472 and that of a signal (E2) prior to the determination circuit 474. The band-elimination filter 472 is denoted also as Band-Elimination-Filter (BEF).

First, the signal (E1) is input into the band-elimination filter 472 from the receiver 172. The signal (E1) is a signal encoded by the encoder 402. The signal (E1) has six amplitudes (e11, e12, e13, e14, e15, and e16). As is understood from the generation process of the code (C) shown in FIG. 15, the amplitudes e11, e13, e14 and e16 are determined to be the bit value "1". On the other hand, the amplitudes e12 and e15 are determined to be the bit value "0".

That is, in the signal (E1), four amplitudes (e11, e13, e14 and e16) are used to represent the bit value "1" and two amplitudes (e12 and e15) are used to represent the bit value "0". Thus, it is necessary to have four thresholds (L1, L2, L3, and L4) to determine each bit of the signal (E1). Further, the interval between thresholds will be narrower and higher setting precision for setting the threshold is demanded. As is understood from the generation process of the code (C) shown in FIG. 15, the reason why a total of five amplitudes is used to represent two bit values is that a clock of a large amplitude is synchronously added in the generation process.

Thus, the decoder 434 according to the present embodiment is formed so as to perform determination processing of data after removing a clock component contained in the signal (E1) in advance. Thus, the decoder 434 is provided with the band-elimination filter 472 prior to the determination circuit 474. The band-elimination filter 472 is a unit to stop passage of a signal of a predetermined frequency band. Particularly in the present embodiment, a stop band is set at frequency Fb so that a line spectrum at frequency Fb corresponding to a clock component is removed on the frequency axis of the frequency spectrum shown in FIG. 16.

Here, band-elimination characteristics of the band-elimination filter 472 will be briefly described with reference to FIG. 21. In FIG. 21, the signal (E1) prior to the band-elimination filter 472, band transfer characteristics of the band-elimination filter 472, and the signal (E2) subsequent to the band-elimination filter 472 are shown.

First, the frequency spectrum of the signal (E1) will be focused on. As described above, the spectrum of the signal (E1) includes a spectrum corresponding to the PR (1, 0, −1) code and a line spectrum of a clock component appearing at the position of the frequency Fb. The signal (E1) is characterized in that the line spectrum of a clock component is apart from a main lobe (0≦f≦Fb/2) of the PR (1, 0, −1) code on the frequency axis.

Next, transfer characteristics of the band-elimination filter 472 will be focused on. Transfer characteristics of the band-elimination filter 472 have a steep stop band at frequency Fb. Thus, after the signal (E1) passes through the band-elimination filter 472, a signal component corresponding to a frequency band of a predetermined width positioned near the frequency Fb on the frequency axis is significantly attenuated. As shown in FIG. 21, the stop band of the band-elimination filter 472 has a finite width. Thus, if the line spectrum of a clock component is contained in the main lobe of the PR (1, 0, −1) code or positioned near the main lobe, the main lobe will also be attenuated.

To avoid attenuation of the main lobe described above, a code (for example, the signal (E1)) that makes a line spectrum and a main lobe positioned apart from each other on the frequency axis is used. As a result, as shown in FIG. 21, the signal (E2) after passing through the band-elimination filter 472 shows a frequency spectrum in which the main lobe of the PR (1, 0, −1) code is not attenuated and the line spectrum corresponding to a clock component is removed. That is, the frequency spectrum of the original PR (1, 0, −1) code is obtained. Thus, by using the encoding method in the present embodiment, the line spectrum corresponding to a clock component can easily be removed on the receiving side.

If a clock component is removed from the signal (E1) passing through the band-elimination filter 472 in this manner, the waveform of the signal (E2) after passing through the band-elimination filter 472 is an eye pattern shown in FIG. 20. The amplitudes e11 and e13 are converted into a level e33, the amplitudes e14 and e16 into a level e31, and the amplitudes e12 and e15 into a level e32 by a clock component being removed from the signal (E1) by the band-elimination filter 472. Therefore, the levels e31 and e33 correspond to the bit value "1" and the level e32 to the bit value "0". Thus, as shown in FIG. 20, the bit value can be determined by setting thresholds L1' and L2' and comparing these thresholds and three levels. That is, the number of thresholds used for determination of the bit value is reduced by half from four to two.

As shown in FIG. 20, the signal (E2) after passing through the band-elimination filter 472 is input into the determination circuit 474. The determination circuit 474 determines uses predetermined thresholds L1' and L2' to determine the bit value. For example, the determination circuit 474 outputs the determination value "1" when the level is L>L1, the determination value "0" when L2'<L<L1', and the determination value "−1" when L<L2'. The determination value output from the determination circuit 474 is input into the decoding circuit 476. The determination value output from the determination circuit 474 is a PR (1, 0, −1) code corresponding to the code (A) in FIG. 15. Thus, the determination value can be decoded by the PR (1, 0, −1) decoder shown in FIG. 17. Therefore, the decoding circuit 476 similarly reconstructs an original data string like the PR (1, 0, −1) decoder in FIG. 17.

In the foregoing, the function configuration of the mobile terminal 400, encoding method, and decoding method according to the present embodiment have been described. In the encoding method according to the present embodiment, as described above, an encoded signal is generated by a clock of frequency Fb being synchronously added to a code in partial response mode having the transmission speed Fb. In the above example, the PR (1, 0, −1) code is illustrated as a code to which a clock is added. If the code is used, when compared with a case in which an AMI code is used, the width of a main lobe is compressed in the frequency axis direction. Further, with the clock frequency set at Fb described above, a line spectrum corresponding to a clock component of an encoded signal appears apart from a main lobe corresponding to the original code on the frequency axis.

The above clock has an amplitude larger than that of the code. Thus, the encoded signal has characteristics of having no DC component and reversing polarity in each period. As a result, the encoded signal can be transmitted also by using a transmission line through which a DC current is passed such as a power line. Further, a clock can be reproduced on the receiving side by detecting a polarity reversal period of the encoded signal without using any PLL. Moreover, as described above, the main lobe corresponding to the original code and the line spectrum corresponding to a clock component are positioned apart from each other on the frequency axis and thus, the clock component can easily be removed using a band-elimination filter.

Further, the number of thresholds used for determination of the bit value can be reduced by determining the bit value from a signal in which a clock component has been removed from an encoded signal. As a result, the number of comparators used for threshold determination can be reduced, leading to a reduced circuit scale. Moreover, an eye pattern of a signal obtained by removing a clock component from an encoded signal has an improved eye opening rate so that the interval between thresholds is widened. As a result, setting precision of the threshold is relaxed. Therefore, there is no need to use a PLL on the receiving side and the number of comparators can be reduced so that the scale of circuits provided to reproduce the original data from an encoded signal and power consumption can significantly be reduced.

[Summary]

Lastly, the function configuration held by a mobile terminal in the present embodiment and operation effects obtained from the function configuration will be briefly summarized. The mobile terminal has a first information processing module corresponding to the operation unit 108 and a second information processing module corresponding to the display unit 102.

The first information processing module has a function to transmit a signal encoded in such a way that input data containing a first bit value and a second bit value that are mutually different is represented by a plurality of first amplitude values, the second bit value is represented by a second amplitude value that is different from the first amplitude values, the same amplitude value is not taken successively, and polarity of the amplitude value is reversed in each period.

More specifically, the first information processing module has a data encoding unit, clock signal addition unit, and signal transmission unit described below. The data encoding unit is used to encode input data to generate an encoded signal in partial response mode having the transmission speed Fb. By adopting the partial response mode, when compared with AMI coding mode or the like, the bandwidth of a main lobe on the frequency axis can be compressed.

The clock signal addition unit is used to synchronously add a clock signal of frequency Fb having an amplitude larger than that of an encoded signal to the encoded signal generated by the data encoding unit. Thus, by synchronously adding the clock signal of the same frequency Fb as the transmission speed Fb of an encoded signal, the signal after the addition will have a spectrum in which a main lobe corresponding to an encoded signal component and a line spectrum corresponding to a clock component appear apart from each other. The encoded signal to which the clock component is added by the clock signal addition unit is transmitted to the signal transmission unit through a predetermined transmission line.

On the other hand, the second information processing module has a signal receiving unit, band-elimination filter, and input data decoding unit described below. The signal receiving unit is used to receive the encoded signal via the predetermined transmission line. The band-elimination filter is used to remove a frequency component of a predetermined width containing the frequency Fb from an encoded signal received by the signal receiving unit. With a frequency component of a predetermined width containing the frequency Fb being removed from a received encoded signal in this manner, a line spectrum corresponding to a clock component is removed. That is, a clock component is removed from a received encoded signal.

As described above, the frequency spectrum of a received encoded signal appears as a main lobe of a spectrum corresponding to an encoded signal before a clock being added and a line spectrum corresponding to a clock component on the frequency axis apart from each other. Thus, even if a stop band of a band-elimination filter has a finite width, the line spectrum can be removed without significantly affecting the main lobe. A signal whose clock component is removed in this manner is input into the input data decoding unit. The input data decoding unit is used to decode the input data based on the amplitude value of a signal output from the band-elimination filter. Since a clock component has been removed from the received signal, the number of thresholds used for determination of each bit value of input data by the input data decoding unit can be reduced. Moreover, the signal shape after a clock component being removed has a large eye opening rate so that setting precision of the threshold is relaxed.

The second information processing module may further include a clock component detection unit that detects a clock component of an encoded signal based on a reversal period by detecting the reversal period of polarity held by the amplitude value of the encoded signal received by the signal receiving unit. In this case, the input data decoding unit uses the clock component detected by the clock component detection unit to be able to obtain the input data by decoding. As described above, the received encoded signal has characteristics that polarity thereof is reversed in each period in synchronization with the clock and thus, a clock component can be extracted on the receiving side without using any PLL. As a result, power consumption can be reduced by an amount for eliminating the PLL.

As the predetermined transmission line, a power line through which a DC current is passed may be used. In this case, the encoded signal is transmitted after being superimposed on the DC current by the signal transmission unit and separated from the DC current by the signal receiving unit. As described above, a code transmitted/received between the first and second information processing modules contains no DC component. Thus, the above power line can be used as a transmission line. As a result, a transmission line is realized by using one coaxial cable so that flexibility of deforming a portion that connects the first and second information processing modules can significantly be improved.

(Notes)

The encoder 402 is an example of the data encoding unit and the clock signal addition unit. The driver 156 and the superimposition unit 232 are examples of the signal transmission unit. The decoding processing unit 432, the decoder 434, and the band-elimination filter 472 are examples of a band-elimination filter unit. The decoding processing unit 432, the decoder 434, the determination circuit 474, and the decoding circuit 476 are examples of the input data decoding unit. The clock detection unit 436 is an example of the clock component detection unit. The coaxial cable is an example of the power line.

It should be understood by those skilled in the art that various modifications, combinations, sub-combinations and alterations may occur depending on design and other factors insofar as they are within the scope of the appended claims or the equivalents thereof.

In the above embodiment, for example, the PR (1, 0, −1) code is taken as an example of a code input into the adder ADD, but technology of the present invention is not limited to this. As described above, various kinds of bipolar codes and codes PR (1, 0, 0, −1), (1, 0, . . . , 0, −1) and the like in partial response mode can be used.

In the above description, a case in which technology of the present embodiment is applied to signal transmission between the serializer 134 and the deserializer 138 forming the mobile terminal 400 is illustrated and technology of the present embodiment is described based on this example. However, technology of the present embodiment can be used when a signal is transmitted between two information processing modules having any configuration.

For example, technology of the present embodiment can be used when two information processing apparatuses are connected by a power line and a signal is transmitted via the power line. In this case, two information transmission apparatuses are formed as separate apparatuses. Moreover, the type of such information processing apparatuses is arbitrary and includes mobile information terminals such as mobile phones, Personal Handy-phone System (PHS), and Personal Digital Assistant (PDA). Further, home game machines, TV sets, and recording/reproducing apparatuses are also included in the information processing apparatuses.

The present application contains subjected matter related to that disclosed in Japanese Priority Patent Application JP 2008-221858 filed in the Japan Patent Office on Aug. 29, 2008, the entire contents of which is hereby incorporated by reference.

What is claimed is:

1. An information processing apparatus, comprising:
a data encoding unit that generates an encoded signal in partial response mode having a transmission speed Fb by encoding input data;
a clock signal addition unit that synchronously adds a clock signal at frequency Fb having an amplitude value larger than that of the encoded signal to the encoded signal generated by the data encoding unit;
a signal transmission unit that transmits the encoded signal obtained by the clock signal being added by the clock signal addition unit through a predetermined transmission line;
a signal receiving unit that receives the encoded signal through the predetermined transmission line;
a band-elimination filter that removes a frequency component of a predetermined width containing the frequency Fb from the encoded signal received by the signal receiving unit;
an input data decoding unit that performs decoding to obtain the input data based on an amplitude value of an signal output from the band-elimination filter; and
a clock component detection unit that detects a clock component of the encoded signal based on a reversal period by detecting the reversal period of polarity held by the amplitude value of the encoded signal received by the signal receiving unit,
wherein the input data decoding unit uses the clock component detected by the clock component detection unit to obtain the input data by decoding.

2. An information processing apparatus, comprising:
a data encoding unit that generates an encoded signal in partial response mode having a transmission speed Fb by encoding input data;
a clock signal addition unit that synchronously adds a clock signal at frequency Fb having an amplitude value larger than that of the encoded signal to the encoded signal generated by the data encoding unit;
a signal transmission unit that transmits the encoded signal obtained by the clock signal being added by the clock signal addition unit through a predetermined transmission line; and
a signal receiving unit that receives the encoded signal through the predetermined transmission line,
wherein:
the predetermined transmission line is a power line through which a DC current is passed, and
the encoded signal is transmitted after being superimposed on the DC current and separated from the DC current by the signal receiving unit.

3. An information processing apparatus, comprising:
a signal receiving unit that receives, through a predetermined transmission line, an encoded signal generated by synchronously adding a clock signal at frequency Fb having an amplitude value larger than that of the encoded signal to the encoded signal in partial response mode having a transmission speed Fb;

a band-elimination filter that removes a frequency component of a predetermined width containing the frequency Fb from the encoded signal received by the signal receiving unit; and a signal decoding unit that performs decoding to obtain the encoded signal in the partial response mode based on the amplitude value of the signal from which the frequency component of the predetermined width has been removed by the band-elimination filter, wherein:
  the predetermined transmission line is a power line through which a DC current is passed, and
  the encoded signal is transmitted after being superimposed on the DC current and separated from the DC current by the signal receiving unit.

4. A signal transmission method, comprising the steps of:

generating an encoded signal in partial response mode having a transmission speed Fb by encoding input data;

adding synchronously a clock signal at frequency Fb having an amplitude value larger than that of the encoded signal to the generated encoded signal;

transmitting the encoded signal, obtained by the clock signal addition step, through a predetermined transmission line;

receiving the transmitted encoded signal through the predetermined transmission line;

removing a frequency component of a predetermined width containing the frequency Fb from the received encoded signal;

performing decoding to obtain the input data based on an amplitude value of an signal output from the removing step; and detecting a clock component of the encoded signal based on a reversal period by detecting the reversal period of polarity held by the amplitude value of the encoded signal received by the receiving step, wherein the decoding step uses the detected clock component to obtain the input data by decoding.

5. A decoding method, comprising the steps of:

receiving, through a predetermined transmission line, an encoded signal generated by synchronously adding a clock signal at frequency Fb having an amplitude value larger than that of the encoded signal to the encoded signal in partial response mode having a transmission speed Fb;

removing a frequency component of a predetermined width containing the frequency Fb from the received encoded signal; and performing decoding to obtain the encoded signal in the partial response mode based on the amplitude value of the signal from which the frequency component of the predetermined width has been removed in the removing step, wherein:
  the predetermined transmission line is a power line through which a DC current is passed, and
  the encoded signal is transmitted after being superimposed on the DC current and separated from the DC current by the receiving step.

* * * * *